US011295622B2

(12) United States Patent
Goel et al.

(10) Patent No.: US 11,295,622 B2
(45) Date of Patent: Apr. 5, 2022

(54) DETERMINING VTOL DEPARTURE TIME IN AN AVIATION TRANSPORT NETWORK FOR EFFICIENT RESOURCE MANAGEMENT

(71) Applicant: Joby Aero, Inc., Santa Cruz, CA (US)

(72) Inventors: Nikhil Goel, San Francisco, CA (US); Jon David Petersen, Walnut Creek, CA (US); John Conway Badalamenti, San Francisco, CA (US); Mark Moore, San Francisco, CA (US)

(73) Assignee: Joby Aero, Inc., Santa Cruz, CA (US)

( * ) Notice: Subject to any disclaimer, the term of this patent is extended or adjusted under 35 U.S.C. 154(b) by 0 days.

(21) Appl. No.: 16/367,874

(22) Filed: Mar. 28, 2019

(65) Prior Publication Data
US 2019/0325757 A1 Oct. 24, 2019

Related U.S. Application Data

(60) Provisional application No. 62/662,189, filed on Apr. 24, 2018.

(51) Int. Cl.
*G08G 5/00* (2006.01)
*B64C 29/00* (2006.01)
(Continued)

(52) U.S. Cl.
CPC .......... *G08G 5/0043* (2013.01); *B64C 17/08* (2013.01); *B64C 29/00* (2013.01); *G05D 1/102* (2013.01);
(Continued)

(58) Field of Classification Search
CPC ............... G08G 5/0043; G08G 5/0013; G08G 5/0065; G08G 5/025; G08G 5/0091;
(Continued)

(56) References Cited

U.S. PATENT DOCUMENTS 9,301,099 B2 3/2016 Witmer
9,424,515 B2 8/2016 Atlas
(Continued)

FOREIGN PATENT DOCUMENTS

CN 104807457 7/2015
CN 110663221 1/2020
(Continued)

OTHER PUBLICATIONS

Uber, "Fast-Forwarding to a Future of On-Demand Urban Air Transportation", Uber Elevate , (Oct. 27, 2016), 98 )gs (Year: 2016).*
Uber, "Fast-Forwarding to a Future of On-Demand Urban Air Transportation", Uber Elevate , (Oct. 27, 2016), 98 Pgs (Year: 2016) (Year: 2016).*
"International Application Serial No. PCT IB2019 052578, International Search Report dated Aug. 1, 2019", 3 pgs.
(Continued)

*Primary Examiner* — Rutao Wu
*Assistant Examiner* — Tyrone E Singletary
(74) *Attorney, Agent, or Firm* — Dority & Manning, P.A.

(57) ABSTRACT

A request for transport services that identifies a rider, an origin, and a destination is received from a client device. Eligibility of the request to be serviced by a vertical take-off and landing (VTOL) aircraft is determined based on the origin and the destination. The client device is sent an itinerary for servicing the transport request including a leg serviced by the VTOL aircraft. Confirmation is received that the rider has boarded the VTOL aircraft and determination made as to whether the VTOL aircraft should wait for additional riders. Instruction are sent to the VTOL aircraft to take-off if one or more conditions are met.

17 Claims, 8 Drawing Sheets

(51) Int. Cl.
*G06Q 10/06* (2012.01)
*G05D 1/10* (2006.01)
*G06Q 50/30* (2012.01)
*G08G 5/02* (2006.01)
*B64C 17/08* (2006.01)

(52) U.S. Cl.
CPC ....... *G05D 1/104* (2013.01); *G06Q 10/06315* (2013.01); *G06Q 50/30* (2013.01); *G08G 5/0013* (2013.01); *G08G 5/0065* (2013.01); *G08G 5/025* (2013.01)

(58) Field of Classification Search
CPC ............... G08G 5/0026; G08G 5/0034; G08G 5/0082; B64C 17/08; B64C 29/00; G06Q 10/06315; G06Q 50/30; G06Q 10/0631; G05D 1/102; G05D 1/104
USPC ...................................................... 705/7.25
See application file for complete search history.

(56) References Cited

U.S. PATENT DOCUMENTS

| | | | |
|---|---|---|---|
| 9,550,577 | B1 | 1/2017 | Beckman et al. |
| 10,384,692 | B2 | 8/2019 | Beckman et al. |
| 10,627,524 | B2 | 4/2020 | Bennett et al. |
| 10,663,529 | B1 | 5/2020 | Bolotski et al. |
| 10,713,957 | B2 | 7/2020 | Goel et al. |
| 10,913,528 | B1* | 2/2021 | Moore ................. B64C 29/0016 |
| 2010/0185486 | A1* | 7/2010 | Barker ............... G06Q 30/0202 705/7.31 |
| 2010/0299177 | A1* | 11/2010 | Buczkowski .......... G06Q 50/30 705/7.13 |
| 2012/0290652 | A1* | 11/2012 | Boskovic ............... G06Q 50/30 709/204 |
| 2013/0144831 | A1 | 6/2013 | Atlas |
| 2016/0244158 | A1 | 8/2016 | Fredericks et al. |
| 2016/0311529 | A1 | 10/2016 | Brotherton-Ratcliffe et al. |
| 2017/0021941 | A1 | 1/2017 | Fisher et al. |
| 2017/0057650 | A1 | 3/2017 | Walter-Robinson |
| 2017/0090484 | A1* | 3/2017 | Obaidi ................. B64D 47/08 |
| 2017/0097240 | A1 | 4/2017 | Murrish et al. |
| 2017/0169366 | A1* | 6/2017 | Klein ..................... G06Q 50/30 |
| 2017/0197710 | A1* | 7/2017 | Ma ....................... B64C 29/0025 |
| 2017/0357914 | A1* | 12/2017 | Tulabandhula ....... H04W 4/025 |
| 2018/0081360 | A1 | 3/2018 | Bostick et al. |
| 2018/0208305 | A1 | 7/2018 | Lloyd et al. |
| 2018/0305005 | A1 | 10/2018 | Parks et al. |
| 2018/0308366 | A1* | 10/2018 | Goel ..................... G06Q 50/30 |
| 2019/0012909 | A1* | 1/2019 | Mintz .................... G08G 1/017 |
| 2019/0325755 | A1 | 10/2019 | Goel et al. |

FOREIGN PATENT DOCUMENTS

| | | |
|---|---|---|
| JP | 2010095246 | 4/2010 |
| JP | 2020518070 | 6/2020 |
| WO | 2016130711 | 8/2016 |
| WO | 2018198038 | 11/2018 |
| WO | 2019207377 | 10/2019 |

OTHER PUBLICATIONS

"International Application Serial No. PCT IB2019 052578, Written Opinion dated Aug. 1, 2019", 5 pgs.
Miao, Fei, "Taxi Dispatch With Real-Time Sensing Data in Metropolitan Areas: A Receding Horizon Control Approach", In: IEEE Transactions on Automation Science and Engineering vol. 13, Issue 2, [Online] Retrieved from the internet:https: ieeexplore.ieee.org document 7438925 , (Mar. 22, 2016), 463-478.
Uber, "Fast-Forwarding to a Future of On-Demand Urban Air Transportation", Uber Elevate , (Oct. 27, 2016), 98 pgs.
"International Application Serial No. PCT IB2019 052578, International Preliminary Report on Patentability dated Nov. 5, 2020", 7 pgs.
"International Application Serial No. PCT IB2018 052864, International Search Report dated Aug. 7, 2018", 3 pgs.
"International Application Serial No. PCT IB2018 052864, Written Opinion dated Aug. 7, 2018", 6 pgs.
"U.S. Appl. No. 16/460,447, First Action Interview—Pre-Interview Communication dated Aug. 20, 2019", 4 pgs.
"U.S. Appl. No. 16/460,447, First Action Interview—Office Action Summary dated Oct. 29, 2019", 4 pgs.
"International Application Serial No. PCT IB2018 052864, International Preliminary Report on Patentability dated Nov. 7, 2019", 8 pgs.
"European Application Serial No. 18790347.1, Extended European Search Report dated Jan. 8, 2020", 8 pgs.
"U.S. Appl. No. 16/460,447, Response filed Dec. 27, 2019 to First Action Interview—Office Action Summary dated Oct. 29, 2019", 13 pgs.
"U.S. Appl. No. 16/460,447, Notice of Allowance dated Mar. 2, 2020", 10 pgs.
"Chinese Application Serial No. 201880034496.0, Voluntary Amendment filed Apr. 24, 2020", w English claims, 12 pgs.
"U.S. Appl. No. 16/460,447, Corrected Notice of Allowability dated May 22, 2020", 9 pgs.
"U.S. Appl. No. 15/961,806, First Action Interview—Pre-Interview Communication dated Jun. 2, 2020", 4 pgs.
"U.S. Appl. No. 15/961,806, Response filed Jul. 1, 2020 to Pre-Interview Communication and Request for Interview dated Jun. 2, 2020", 9 pgs.
"European Application Serial No. 18790347.1, Response filed Aug. 7, 2020 to Extended European Search Report dated Jan. 8, 2020", 47 pgs.
"U.S. Appl. No. 15/961,806, First Action Interview—Office Action Summary dated Aug. 31, 2020", 7 pgs.
"U.S. Appl. No. 15/961,806, Response filed Oct. 30, 2020 to First Action Interview—Office Action Summary dated Aug. 31, 2020", 12 pgs.
"U.S. Appl. No. 15/961,806, Final Office Action dated Dec. 15, 2020", 7 pgs.
"Chinese Application Serial No. 201880034496.0, Office Action dated Dec. 3, 2020", w English translation, 14 pgs.
"U.S. Appl. No. 15/961,806, Response filed Feb. 15, 2021 to Final Office Action dated Dec. 15, 2020", 9 pgs.
"U.S. Appl. No. 15/961,806, Notice of Allowance dated Mar. 2, 2021", 6 pgs.
Miao, Fei, "Data-Driven Robust Taxi Dispatch under Demand Uncertainties", [Online] Retrieved from the internet:http:adsabs. harvard.edu abs 2016arXiv160306263M, (Mar. 2016), 17 pgs.

* cited by examiner

DETERMINING VTOL DEPARTURE TIME IN AN AVIATION TRANSPORT NETWORK FOR EFFICIENT RESOURCE MANAGEMENT

CROSS-REFERENCE TO RELATED APPLICATION(S)

This application claims priority under 35 U.S.C. § 119(e) to U.S. Provisional Patent Application No. 62/662,189 filed Apr. 24, 2018, which is incorporated by reference.

BACKGROUND

1. Technical Field

The subject matter described generally relates to aviation transport networks, and in particular to managing a network including ad hoc flights between nodes.

2. Background Information

There is generally a wide variety of modes of transport available within cities. People may walk, ride a bike, drive a car, take public transit, use a ride sharing service, and the like. However, as population densities and demand for land increase, many cities are increasingly experiencing problems with traffic congestion and the associated pollution. Consequently, there is a need to expand the available modes of transport in ways that may reduce the amount of traffic without requiring the use of large amounts of land.

DETAILED DESCRIPTION

Figure 1:
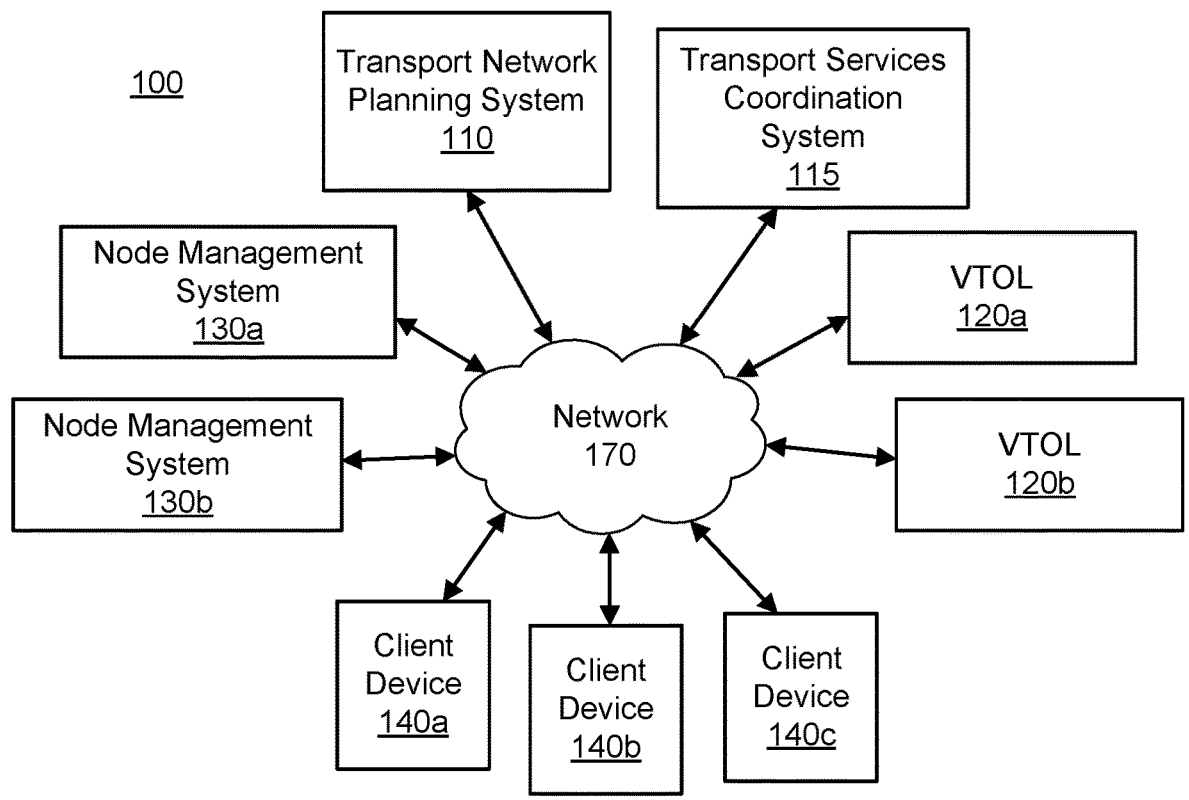
FIG. 1 is a high-level block diagram illustrating a computing environment associated with a transport network, according to one embodiment.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview

Air travel within cities has been limited compared to ground travel. Air travel can have a number of requirements making intra-city air travel difficult. For instance, aircraft can require significant resources such as fuel and infrastructure (e.g., runways), produce significant noise, require significant time for boarding and alighting, and are limited by airspace regulation, each presenting technical challenges for achieving larger volume of air travel within cities or between neighboring cities. However, providing such air travel may reduce travel time over purely ground-based approaches as well as alleviate problems associated with traffic congestion.

Vertical take-off and landing (VTOL) aircraft provide opportunities to incorporate aerial transportation into transport networks for cities and metropolitan areas. VTOL aircraft require much less space to take-off and land relative to traditional aircraft. In addition, developments in battery technology have made electric VTOL aircraft technically and commercially viable. Electric VTOL aircraft may be quieter than aircraft using other power sources, which further increases their viability for use in built-up areas where noise may be a concern.

In a planning phase, estimates of demand are used to identify candidate locations for nodes within a geographic region at which VTOL aircraft take-off and land. The demand estimates may also be used to narrow down the candidate locations to a selected subset of locations that best meets some predetermined objective (e.g., maximizing total trip coverage by VTOL aircraft, maximizing reductions in travel time, etc.). Flow of VTOL aircraft and people through the transport can then be simulated to gain insight into the proposed aviation transport network and further refine its configuration to better meet specified objectives.

Once a set of nodes have been built and a fleet of VTOL aircraft are in operation, demand prediction and network optimization processes may be used to coordinate provision of transport services. By optimizing the use of the VTOL aircraft fleet, the total power usage and wear and tear may be reduced while still saving riders significant amounts of time relative to ground-based transportation.

In various embodiments, a transport network coordination system receives a request for transport services that identifies one or more riders, each with an origin and a destination, from a client device. Eligibility of the request to be serviced by a VTOL aircraft is determined based on the origin and the destination. The client device is sent an itinerary for servicing the transport request including a leg serviced by the VTOL aircraft. Confirmation is received that the rider has boarded the VTOL aircraft and a determination made as to whether the VTOL aircraft should wait for additional riders. Instructions are sent to the VTOL aircraft to take-off if one or more conditions are met. For example, riders may be matched to share a VTOL aircraft if both still achieve a threshold saving in travel time relative to ground-based transportation, neither is delayed more than a threshold amount relative to being assigned to different VTOL aircraft, etc. In one embodiment, pricing may be dynamically adjusted (e.g., reduced) to induce demand when one or more seats are likely to be available for a flight segment.

Example System Environment

FIG. 1 illustrates one embodiment of a computing environment 100 associated with an aviation transport network. In the embodiment shown in FIG. 1, the computing environment 100 includes a transport network planning system 110, a transport services coordination system 115, a set of vertical take-off and landing (VTOL) aircraft 120a, 120b, a set of node management systems 130a, 130b and a set of client devices 140a, 140b, 140c all connected via a network 170. Where multiple instances of a type of entity are depicted and distinguished by a letter after the corresponding reference numeral, such entities shall be referred to herein by the reference numeral alone unless a distinction between two different entities of the same type is being drawn. In other embodiments, the computing environment 100 contains different and/or additional elements. In addition, the functions may be distributed among the elements in a different manner than described. For example, the node management systems 130 may be omitted with information about the nodes stored and updated at the transport network planning system 110.

The transport network planning system 110 assists in the planning and design of the transport network. In one embodiment, the transport network planning system 110 estimates demand for transport services, suggests locations for VTOL nodes to help meet that demand, and simulates the flow of riders and VTOL aircraft between the nodes to assist in network planning. Embodiments of the transport network planning system 110 are described in greater detail below, with reference to FIGS. 2 through 6.

The transport services coordination system 115 coordinates transport services once a set of VTOL nodes are operational. The transport services coordination system 115 pairs users who request transport services (riders) with specific VTOL aircraft 120. The transport services coordination system 115 may also interact with ground-based transportation to coordinate travel services. For example, the transport services coordination system 115 may be an extension of an existing transport services coordinator, such as a ridesharing service.

In one embodiment, the transport services coordination system 115 treats a journey involving a VTOL aircraft 120 as having three legs: (1) from the rider's initial location to a first node; (2) from the first node to a second node in a VTOL; and (3) from the second node to the rider's destination. The first and third legs may be walking or provided by ground transportation, such as a ride-sharing service. The transport services coordination system 115 provides routing information to VTOL aircraft 120, such as what time to leave a current node, which node to fly to after departure, waypoints along the way, expected durations of flight segments, expected energy usage for flights segments, how long to spend charging before departure or on arrival, the identity of individuals to carry, and the like. The transport services coordination system 115 may also direct certain VTOL aircraft 120 to fly between nodes without riders to improve fleet distribution (referred to as "deadheading"). Various embodiments of the transport services coordination system 115 are described in greater detail below, with reference to FIG. 7.

The VTOL aircraft 120 are vehicles that fly between nodes in the transport network. A VTOL aircraft 120 may be controlled by a human pilot (inside the vehicle or on the ground) or it may be autonomous. In one embodiment, the VTOL aircraft 120 are battery-powered aircraft that use a set of propellers for horizontal and vertical thrust. The configuration of the propellers enables the VTOL aircraft to take-off and land vertically (or substantially vertically). For convenience, the various components of the computing environment 100 will be described with reference to this embodiment. However, other types of aircraft may be used, such as helicopters, planes that take-off at angles other than vertical, and the like. The term VTOL should be construed to include such vehicles.

A VTOL aircraft 120 may include a computer system that communicates status information (e.g., via the network 170) to other elements of the computing environment 100. The status information may include current location, current battery charge, potential component failures, and the like. The computer system of the VTOL aircraft 120 may also receive information, such as routing information, weather information, and energy availability at nodes where the VTOL aircraft is scheduled to be, or currently is, located (e.g., a number of kilowatt hours that may be drawn from the power grid at a node). Although two VTOL aircraft 120 are shown in FIG. 1, a transport network can include any number of VTOL aircraft.

A node management system 130 provides functionality at a node in the transport network. A node is a location at which VTOL aircraft 120 are intended to land (and take-off). Within a transport network, there may be different types of node. For example, a node in a central location with a large amount of rider throughput might include sufficient infrastructure for sixteen (or more) VTOL aircraft 120 to simultaneously (or almost simultaneously) take off or land. Similarly, such a node might include multiple charging stations for recharging battery-powered VTOL aircraft 120. In contrast, a node located in a sparely populated suburb might include infrastructure for a single VTOL aircraft 120 and have no charging station. The node management system 130 may be located at the node or remotely and be connected via the network 170. In the latter case, a single node management system 130 may serve multiple nodes.

In one embodiment, a node management system 130 monitors the status of equipment at the node and reports to the transport network planning system 110. For example, if there is a fault in a charging station, the node management system 130 may automatically report that it is unavailable for charging VTOL aircraft 120 and request maintenance or a replacement. The node management system 130 may also control equipment at the node. For example, in one embodiment, a node includes one or more launch pads that may move from a take-off/landing position to embarking/disembarking position. The node management system 130 may control the movement of the launch pad (e.g., in response to instructions received from transport services coordination system 115 and/or a VTOL aircraft 120).

The client devices 140 are computing devices with which users may arrange transport services within the transport network. Although three client devices 140 are shown in FIG. 1, in practice, there may be many more (e.g., thousands or millions of) client devices connected to the network 170. In one embodiment, the client devices 140 are mobile devices (e.g., smartphones, tablets, etc.) running an application for arranging transport services. A user provides a pickup location and destination within the application and the client device 140 sends a request for transport services to the transport services coordination system 115. Alternatively, the user may provide a destination and the pickup location is determined based on the user's current location (e.g., as determined from GPS data for the client device 140).

Regardless of how they are generated, the transport services coordination system 115 determines how to service transport requests. In one embodiment, a transport request can be serviced by a combination of ground-based and aerial transportation. The transport services coordination system 115 sends information about how the request will be serviced to the user's client device (e.g., what vehicle the user should get into, directions on where to walk, if necessary, etc.). Various embodiments of how the transport services coordination system 115 services transport requests are described in greater detail below, with reference to FIG. 7.

The network 170 provides the communication channels via which the other elements of the networked computing environment 100 communicate. The network 170 can include any combination of local area and/or wide area networks, using both wired and/or wireless communication systems. In one embodiment, the network 170 uses standard communications technologies and/or protocols. For example, the network 170 can include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 170 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 170 may be represented using any suitable format, such as hypertext markup language (HTML) or extensible markup language (XML). In some embodiments, all or some of the communication links of the network 170 may be encrypted using any suitable technique or techniques.

Transport Network Planning

Figure 2:
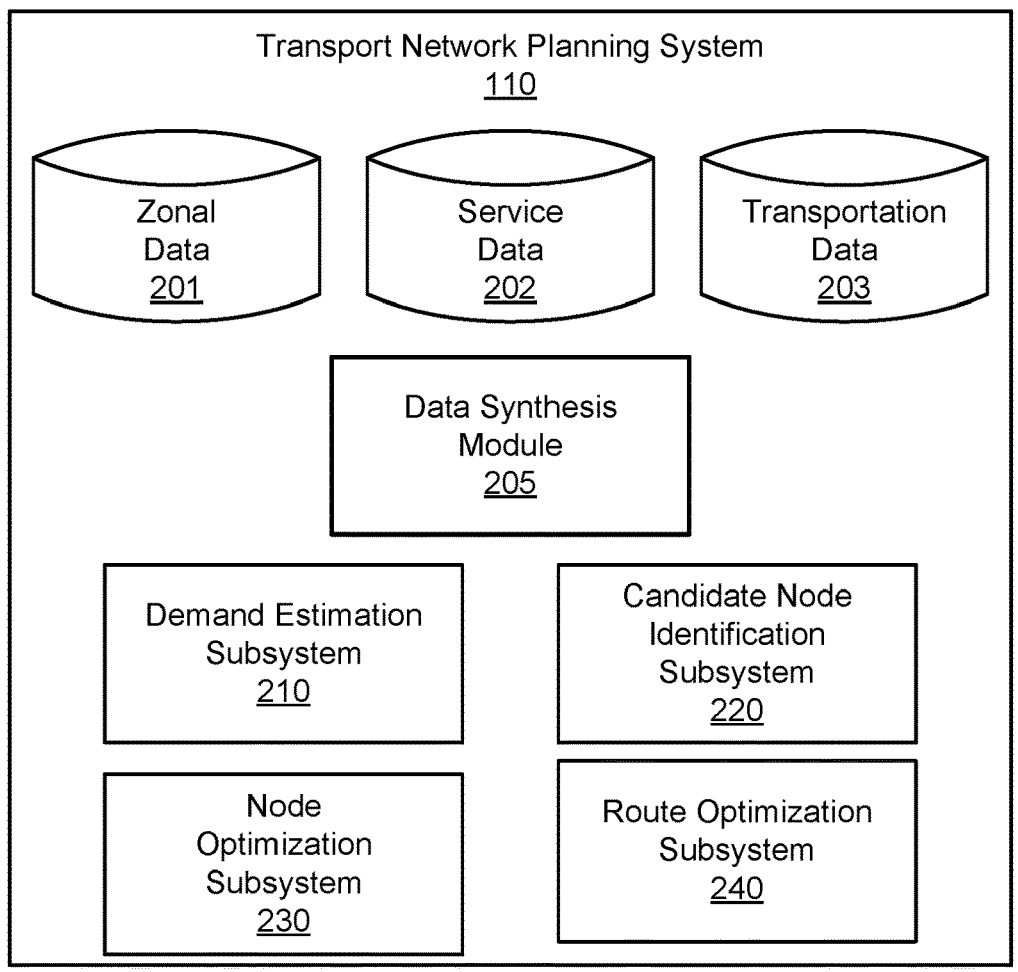
FIG. 2 is a high-level block diagram illustrating the transport network management system shown in FIG. 1, according to one embodiment.

FIG. 2 illustrates one embodiment of the transport network planning system 110. In the embodiment shown in FIG. 2, the transport network planning system 110 includes a data synthesis module 205, a demand estimation subsystem 210, a candidate node identification subsystem 220, a node optimization subsystem 230, and a route optimization subsystem 240. The transport network planning system 110 also includes zonal data 201, service data 202, and transportation data 203. Although this data is shown as being stored within the transport network planning system 110, in some embodiments, the transport network planning system 110 may retrieve some or all of this data from remote sources (e.g., via the network 170). In other embodiments, the transport network planning system 110 contains different and/or additional elements. In addition, the functions may be distributed among the elements in a different manner than described. For example, although the transport network planning system 110 is depicted as connected to the network 170, in some embodiments it is used for initial planning of the transport network and need not be connected to the other depicted components.

The data synthesis module 205 ingests data from one or more sources and processes it into a standardized format for use by the other elements of the transport network planning system 110. In the embodiment shown in FIG. 2, the data synthesis module 205 ingests data from three sources: zonal data 201, service data 202, and transportation data 203. In other embodiments, the data synthesis module 205 may ingest data from different and/or additional sources.

The zonal data 201 defines zones for which data about transportation services is aggregated. In one embodiment, the zone data defines those that are used for a census (e.g., United States census block groups). Such zones are already defined and generally have population and demographic data available (e.g., from the corresponding census). Furthermore, such zones are typically relatively small in areas with high population density so may provide a high level of granularity. In other embodiments, the zone data 201 may define zones using other techniques, such as dividing an area up into a grid of zones of a predetermined area, dividing an area up into a predetermined number of zones of equal area, etc. Alternatively, transportation service data may not be aggregated by zone with the transport network planning system 110 instead modeling individual instances of transpiration between origin and destination coordinates.

The service data 202 is data indicating numbers of requests for transport services between pairs of origin zones and destination zones over time. In one embodiment, the service data 202 divides a day up into one hour blocks and includes a number of requests each hour between each possible origin-destination pair. The service data 202 may be historical data regarding actual requests for transportation services (e.g., from an existing ridesharing service), an estimate based factors such as traffic data and demographics, or a mixture of both. In other embodiments, the service data 202 may include data for different or additional time periods. For example, the service data 202 may differ based on day of the week, month, proximity to holidays or events, etc. The service data 202 may also be divided into groups of different lengths, such as blocks of ten minutes, thirty minutes, two hours, four hours, etc.

The transportation data 203 includes information about the availability of transportation (e.g., between zones) using modes of transport other than VTOL aircraft 120, such as bus, train, personal car, taxi, rideshare, etc. In one embodiment, the transportation data 203 includes an average time taken and cost associated with travelling between each pair of zones using each mode of transport. As described in further detail below, this data may be used to predict the likelihood that a user will elect VTOL transportation over other available methods of transportation to travel from an origin to a destination. For example, if taking VTOL transportation only saves five minutes and cost twice as much as taking ground-based transportation, the user is likely to select ground-based transportation. In contrast, if taking the VTOL saves an hour, the user is more likely to select the VTOL option.

The demand estimation subsystem 210 predicts demand for transport services in a geographic region based on the service data 202. The predicted demand may be provided as input to the other subsystems to assist in the planning of the transport network. In one embodiment, the demand estimation subsystem 210 initially predicts demand based on service data 202 describing existing use of one or more ground-based transportation services in the geographic region. The input may be a geographic region (e.g., a city) and time period, and the predicted demand may be a corresponding set of hypothetical transport requests, each including an origin, destination, and time. Where planning continues after the transport network becomes operational (e.g., where a first set of nodes are built and an expansion including adding additional nodes is planned), the model for predicting demand may be updated over time based on service data 202 that includes flights between nodes in the transport network, as such data becomes available. Various embodiments of the demand estimation subsystem are described in greater detail below, with reference to FIG. 3.

The candidate node identification subsystem 220 identifies a set of candidate locations for nodes within the geographic region. In one embodiment, the candidate node identification subsystem 220 provides an interface with which a user, such as a transport network designer, can manually select candidate locations for nodes (e.g., by providing an address, GPS co-ordinates, clicking on the location on a map, etc.). Alternatively or additionally, the candidate node identification subsystem 220 may automatically identify candidate locations based on predicted demand (e.g., as produced by the demand estimation subsystem 210). Various embodiments of the candidate node identification subsystem 220 are described in greater detail below, with reference to FIG. 4.

The node optimization subsystem 230 takes the set of candidate locations for nodes and selects a subset of the locations at which nodes should actually be positioned based on the predicted demand. In one embodiment, the node optimization subsystem 230 identifies an initial group of node positions to make the transport network operational and one or more additional groups to be added later to improve the coverage of the network. The node optimization subsystem 230 may also recommend a type for each node (e.g., indicating a number of landing pads, a number of chargers, a number of VTOL aircraft storage bays, and the like). Various embodiments of the node optimization subsystem 230 are described in greater detail below, with reference to FIG. 5.

The output from the node optimizations subsystem 230 may be fed into the route optimization subsystem 240. The coverage provided by the nodes identified by the node optimization subsystem 230 provides an upper bound for throughput of the transport network. In other words, it is the maximum throughput achievable by placing nodes at the selected location assuming all qualifying transport requests are served by VTOL aircraft 120. However, this upper bound may not be realized as it does not consider whether a VTOL aircraft 120 will be available to service any given transport request. The route optimization subsystem 240 models the flow of VTOL aircraft 120 and riders through the transport network to determine how to manage the fleet of VTOL aircraft to realize close to the maximum throughput. Various embodiments of the route optimization subsystem 240 are described in greater detail below, with reference to FIG. 6.

Figure 3:
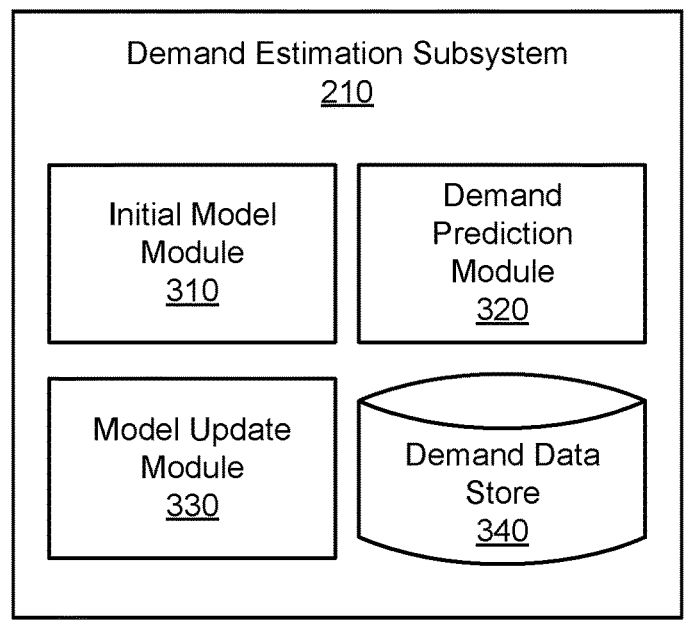
FIG. 3 is a high-level block diagram illustrating the demand estimation subsystem shown in FIG. 2, according to one embodiment.

FIG. 3 illustrates one embodiment of the demand estimation subsystem 210. The demand estimation subsystem 210 predicts demand for transport services within a geographic region. In the embodiment shown in FIG. 3, the demand estimation subsystem 210 includes an initial model module 310, a demand prediction module 320, a model update module 330, and a demand data store 340. In other embodiments, the demand estimation subsystem 210 contains different and/or additional elements. In addition, the functions may be distributed among the elements in a different manner than described. For example, in some embodiments, the demand estimation subsystem 210 is used during planning of the transport network to generate an initial demand model and the model update module 330 may be omitted.

The initial model module 310 generates a model to predict demand for long-distance transportation services within a geographic region that are candidates for servicing via VTOL aircraft 120. The model may be built using historical travel data including requests for transport services over a long distance within the geographic region using ground-based transportation (e.g., service data 202) as a proxy for demand for overall demand for long-distance transportation including requests serviced at least in part by VTOL aircraft 120. The historical travel data may be aggregated from multiple sources. In one embodiment, a request is considered long-distance where the Haversine distance between the origin and destination is between 20 and 100 miles. The initial model module 310 may consider any such requests as being within the geographic region if either the origin or destination is within a given distance (e.g., 120 miles) of a predetermined point (e.g., a center point of the geographic region). The predetermined point and given distance may be selected by the user. Alternatively, the user may define a geofence (e.g., by selecting a set of zones from the zone data 201) and only requests for which the origin or destination (or both) are within the geofence are considered. In other embodiments, other ways of determining which requests are considered to be within the geographic region and candidates for servicing with a VTOL aircraft 120 may be used.

In some embodiments, the initial model module 310 starts with a single estimate based on the historical travel data and uses a stochastic model (e.g., a two-phase stochastic model) to generate a more robust solution that accounts for multiple scenarios. A list of two or more scenarios are defined, each having a corresponding probability that it will occur. In the first phase, a set of node locations are selected (e.g., as described below, with reference to FIGS. 4 and 5). The initial model module 310 then simulates servicing the predicted demand in view of the different scenarios and the corresponding probabilities. Thus, when the transport network is operational, the demand estimation subsystem 210 may analyze current demand data and compare it to the various scenarios to identify which is likely occurring. The demand estimation subsystem 210 may then generate new or updated predictions of future demand based on the identified scenario. The model can also be refined to be more amenable to bad realizations of outcomes. For example, one configuration choice for the transport network might result on average in servicing a greater number of transport requests by VTOL 120 across all scenarios, but in one low probability scenario, the number of requests serviced by VTOL is very low. It may be preferable to select a second configuration in which the average number of requests serviced by VTOL 120 across all scenarios is lower, but there is no scenario where the level of service drops significantly below the average.

The demand prediction module 320 applies the model to predict demand for long-distance transport services in the geographic region during some time period. In various embodiments, the user selects a start and end time for which a prediction is desired. Inputs to the model may include: current population of the geographic region, expected population growth of the geographic region, socioeconomics, locations of businesses and other entities (e.g., transport requests may be more often requested to and from airports, bars, venues, college campuses, etc.), and information about the cost, availability, and duration of other means of transport within the geographic region. If the transport network is already operational, the inputs may also include requests for transport services for the time period that have already been received and/or information about historical demand for transport services. The demand prediction module 320 may apply machine-learning techniques to learn how current inputs (e.g., time of day, day of the week, date, weather, special events, number and distribution of requests for transport services already received for the time period, planned outages or limitations for other modes of transport, and the like) may be mapped to future demand.

In one embodiment, the demand prediction module 320 outputs a number of requests for transportation services between each pair of zones in the geographic region for one or more blocks of time. For example, the demand prediction module 320 may output an expected number of requests for each hour in a day for each pair of zones in a metropolitan area that has VTOL transportation available. The demand prediction module 320 may also determine a probability that each request will ultimately be serviced, at least in part, by VTOL aircraft 120 (rather than another form of transport). The probability may be based on several factors, including: the origin, the destination, the time at which the request is received, an estimate of the time needed to reach the take-off node from the origin, an estimate of the time needed to reach the destination from the landing node, an estimate of the time taken board the VTOL aircraft 120, an estimate of the time taken to match the user with a particular VTOL aircraft, demographic features of the user, and/or the availability and attributes of other modes of transportation (e.g., as indicated by the transportation data 203).

The model update module 330 updates the model used to predict demand as new data becomes available. In one embodiment, once the aviation transport network is operational, the model update module 330 combines the historical travel data derived from ground-based services with travel data derived from requests actually serviced by VTOL aircraft 120. The VTOL services data may be weighted more heavily than the historical data to reflect the fact that it relates to actual VTOL demand rather than a proxy. For example, the transport services coordination system 115 may see an increase in requests for transport services over long-distances as the lower travel times that result from VTOL aircraft availability increase the attractiveness of riders with a long travel time taken on the ground.

The demand data store 340 is one or more computer-readable media configured to store demand data. Although it is depicted as a single entity within the demand estimation subsystem 210, it may be spread across multiple computing devices. For example, the demand data store 340 may be a distributed database that the demand estimation subsystem 210 accesses remotely via the network 170. In one embodiment, the demand data store 340 stores the historical demand data used to build the initial model as well as the data describing actual VTOL services that may be used to update the model. The demand data store 340 may also store the model itself. In some embodiments, the transport network management system 110 serves multiple geographic areas and the demand data store 340 stores different models for each geographic area. Multiple versions of each model may also be stored (e.g., to allow the demand estimation subsystem 210 to roll back to an earlier version if an updated model is found to be less accurate).

Figure 4:
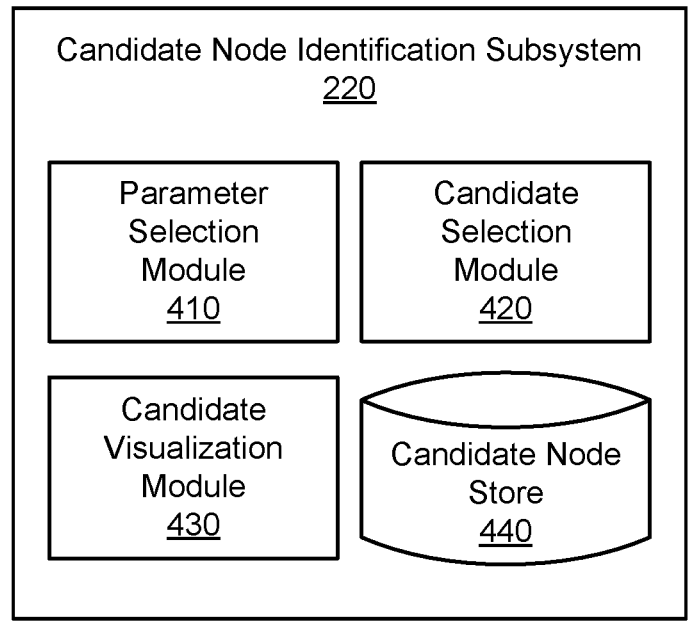
FIG. 4 is a high-level block diagram illustrating the candidate node identification subsystem shown in FIG. 2, according to one embodiment.

FIG. 4 illustrates one embodiment of the candidate node identification subsystem 220. The candidate node identification subsystem 220 identifies candidate locations for nodes at which VTOL aircraft 120 may take off and land. In the embodiment shown in FIG. 4, the candidate node identification subsystem 220 includes a parameter selection module 410, a candidate selection module 420, a candidate visualization module 430, and a candidate node store 440. In other embodiments, candidate node identification subsystem 220 contains different and/or additional elements. In addition, the functions may be distributed among the elements in a different manner than described. For example, some embodiments may omit the candidate visualization module 430 and corresponding functionality.

The parameter selection module 410 provides a user interface for selecting parameters to be used in identifying candidate locations for nodes. In one embodiment, the parameters include the total number of candidate locations to identify, locations that must be considered candidates (e.g., by providing GPS coordinates, etc.), locations that cannot be considered (e.g., by defining a geofence around an excluded area). Alternatively, one or more of the parameters may be predetermined. For example, the number of candidate nodes may be constrained to a fixed value (e.g., 100).

The candidate selection module 420 identifies a set of candidate locations for nodes based on estimated demand (e.g., as produced by the demand estimation subsystem 210) and the selected parameters. In some embodiments, a user may specify candidate locations for consideration (e.g., a real estate portfolio) and/or identify one or more locations that must be selected as nodes. The candidate selection module 420 may apply an algorithm (e.g., a clustering algorithm) to the origins and destinations of the hypothetical transport requests generated by the demand estimation subsystem 210 to discretize the origins and locations. In one embodiment, the algorithm is a k-means clustering algorithm for which k may be set to the total number of candidate locations desired or the total number desired less the number of candidate locations the user has indicated must be included. The candidate selection module 420 identifies the centroid of each cluster as a candidate location for a node. In other embodiments, other approaches may be used to identify candidate locations based on the estimated demand.

The candidate visualization module 430 (if included) presents the candidate locations to the user. In one embodiment, the candidate visualization module displays a map of the geographic region with the candidate locations overlaid (e.g., as black circles, etc.). The candidate visualization module 430 may allow the user to add additional locations that must be considered, remove candidate locations generated by the candidate selection module 420, and/or change the location of candidates. The visualization may also assist the user in modifying the parameters and rerunning the process of identifying candidate locations.

The candidate node store 440 is one or more computer-readable media configured to store the candidate locations for nodes. It may also store a local copy of the data used the candidate node identification subsystem 220, such as estimated demand data. Although it is depicted as a single entity within the candidate node identification subsystem 220, it may be spread across multiple computing devices.

Figure 5:
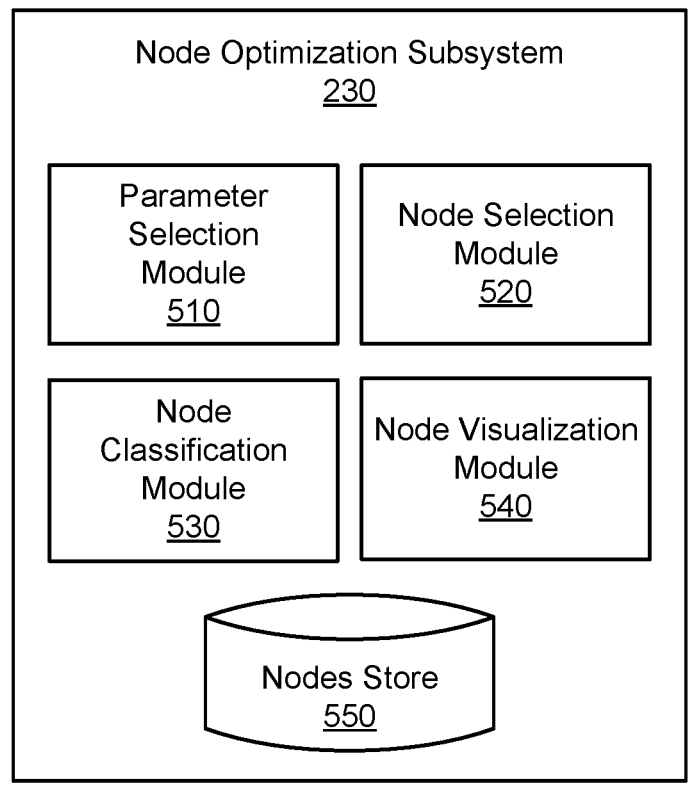
FIG. 5 is a high-level block diagram illustrating the node optimization subsystem shown in FIG. 2, according to one embodiment.

FIG. 5 illustrates one embodiment of the node optimization subsystem 230. The node optimization subsystem 230 assists with selecting which candidate locations for nodes to select to build nodes. In the embodiment shown in FIG. 5, the node optimization subsystem 230 includes a parameter selection module 510, a node selection module 520, a node classification module 530, a node visualization module 540, and a nodes store 550. In other embodiments, the node optimization subsystem 230 contains different and/or additional elements. In addition, the functions may be distributed among the elements in a different manner than described. For example, some embodiments may omit the node visualization module 540 and corresponding functionality.

Similar to its counterpart in the candidate node identification subsystem 220, the parameter selection module 510 provides a user interface for selecting parameters used in determining which candidate locations should be selected for building actual nodes. In one embodiment, the user may select between two objectives: maximizing the number of expected riders whose requests are covered by a departure and arrival pair of nodes or maximizing the total time saved using VTOL aircraft 120. The user may select a fixed number of node locations (e.g., twenty-five) that should be selected or the number may be left to be determined by the optimization objective. Similarly, the user may identify a number (or range) of nodes of different types that should be included (e.g., five large nodes with the capacity for sixteen VTOL aircraft 120, charging equipment, and maintenance services; ten medium nodes with the capacity for four VTOL aircraft, and charging equipment; and ten small nodes with the capacity for one VTOL aircraft). The parameter selection module 510 may also enable the user to identify multiple phases of construction, which may have different objectives. For example, a first phase might be restrained to twenty-five nodes with the goal of maximizing the number of riders served and a second phase might involve building another fifteen nodes with the goal of maximizing the amount of time saved. In other embodiments, different objectives or combinations of objectives may be set.

The parameter selection module 510 may also enable the user to set other parameters regarding the transport network. For example, in one embodiment the user can set a minimum distance (e.g., a Haversine distance) between nodes, a maximum distance VTOL aircraft 120 can travel without recharging, the possible rates at which a VTOL aircraft battery charges, whether the battery can be swapped (and how long it takes), a maximum airspeed of the VTOL aircraft, time taken to take off and land, time taken to load and unload riders, a threshold timesaving for a request to be considered eligible for service by VTOL, a number of riders a VTOL aircraft may carry at once, and curfew times (e.g., a period at night when VTOL aircraft are not allowed to fly), and the like. Some or all of these parameters may be preset and unavailable to be changed by the user. In some embodiments, the transport network may include more than one type of VTOL aircraft 120 and the user may provide the parameters for each type. Alternatively, the user may just select the type or types of VTOL aircraft 120 from a list (e.g., in a drop-down menu) and the parameter selection module 510 retrieves the corresponding information (maximum airspeed, maximum distance without recharging, number of riders that can be carried, etc.) from a data store.

The node selection module 520 selects a subset of the candidate locations as recommended locations to construct nodes. In various embodiments, the node selection module 520 retrieves predicted demand data (e.g., from the demand data store 340) that includes a set of hypothetical requests for transport services. Each hypothetical request includes an origin and a destination. The node selection module 520 identifies a subset of the candidate nodes that meets all of the provided parameters and best meets the selected objective.

In one embodiment, for a given subset of candidate nodes, the node selection module 520 determines how to service each request. A request will either be serviced by a single leg on the ground (e.g., using a ridesharing service) or a set of three legs where the middle leg is serviced by a VTOL aircraft 120. The first and third legs are ground-based, and can be walking legs or serviced by ground-based transportation. A given request may be a candidate for servicing by a VTOL aircraft 120 if the resulting time saving exceeds a threshold (e.g., 40%) over servicing the request entirely with ground-based transportation. The time taken for a VTOL-serviced leg may be estimated by multiplying the Haversine distance by a constant scaling factor (e.g., 1.42) to get a leg distance and assuming a typical airspeed (e.g., 170 miles per hour). Alternatively, the time taken (and energy consumption) of a leg may be estimated using models of the particular VTOL aircraft 120 and the airspace. When a request is serviced by VTOL aircraft 120, the first and third legs may be considered candidates for being walking legs if they are less than a threshold distance (e.g., if the Haversine distance is less than 500 meters).

The node selection module 520 may treat selection of the subset of nodes as a binary optimization problem. For example, define H as the set of candidate nodes each of which are either selected or not and R as the set of requests, indexed by r, each having a set of paths P(r). A path is an itinerary that contains a VTOL-serviced leg. Based on this, one may define three further variables:

1) For each candidate node, h∈H, $z_h$ indicates whether that node is chosen ($z_h$=1) or not ($z_h$=0).
2) $x_{r,p}$ is a binary variable that equals 1 if request r is assigned to path p from P(r) and 0 otherwise.
3) To account for the fact that not all requests may be covered depending upon the nodes chosen, $y_r$ is another binary variable that equals 1 when request r is not assigned a VTOL path and 0 otherwise.

Assigning request r to path p takes incurs some duration savings $\tau_{r,p}$. Formally this is the reduction in minutes relative to taking ground-based transportation and is measured as follows:

$$\tau_{r,p} = T(o(r),d(r)) - [T(o(r),h_{dep}(p)) + \text{VTOL}(h_{dep}(p)h_{arr}(p)) + T(h_{arr}(p),d(r)) + \alpha]$$

Where T(i,j) is the estimated driving time from location i to j, VTOL(i, j) is the estimated duration of taking a VTOL aircraft 120 from node i to node j, and a is a fixed number applied to all VTOL-serviced itineraries consisting of a load time, take off time, landing time, and unload time. Moreover o(r) and d(r) represent the origin and destination of rider r and $h_{dep}(p)$ and $h_{arr}(p)$ represent the departure and arrival nodes for path p. To encourage servicing of as many requests as possible by VTOL 120, a penalty A may be applied for any request not covered by a VTOL route. This leads to the following formulation of the optimization problem:

$$\max \sum_{r \in R} \sum_{p \in P(r)} \left( \sum_{p \in P(r)} \tau_{r,p} x_{r,p} \right) - \lambda y_r \quad (1)$$

$$\text{s.t.} \sum_{p \in P(r)} x_{r,p} + y_r = 1 \forall r \in R \quad (2)$$

$$\sum_{h \in H} z_h = \min\{|H|, b\} \quad (3)$$

$$x_{r,p} \leq \frac{1}{2} z_i + \frac{1}{2} z_j \forall r \in R, \forall (i, j) \in P(r) \quad (4)$$

$$z_i + z_j \leq 1 \forall (i, j) \in C \quad (5)$$

$$x_{r,p} \in \{0, 1\} \forall r \in R, \forall p \in P(r)$$
$$y_r \in \{0, 1\} \forall r \in R$$
$$z_h \in \{0, 1\} \forall h \in H$$

Here, constraint (1) seeks to maximize total duration savings for all requests in the network jointly by favoring assigning requests to itineraries with large time savings (first term) and by penalizing requests not serviced by VTOL aircraft 120 (second term). Constraint (2) ensures all requests are assigned either to a VTOL itinerary or a ground-based itinerary. Constraint (3) ensures the number of nodes selected do not exceed the maximum allowable. Constraint (4) ensures requests are assigned only to itineraries for which both departure and arrival nodes are included in the selected subset. Notice that if either origin (i) or destination (j) node are closed for path p this forces $x_{r,p}$ to be 0. Constraint (5) ensures that for any nodes that are too close together in a set, C, at most one of these nodes is chosen. This set of constraints may be solved by an integer program optimization solver to identify a subset of the candidate nodes that meets the applied constraints and achieves the selected objective. Note that the balance between total time savings and VTOL aircraft 120 utilization may be altered by modifying the magnitude of the penalty applied for requests not serviced by a VTOL aircraft (e.g., by changing the value of λ). In other embodiments, other optimization processes may be used.

In other embodiments, each hypothetical request also includes a probability that the request will be serviced at least in part by a VTOL aircraft 120 (e.g., as generated by the demand prediction module 320). This probability may be incorporated into the model in various ways. A similar base model as described previously may be used, defining R as the set of requests and H as the set of candidate nodes. The node selection module 520 may generate a set of possible origin nodes. Nodes that are too far from the origin and destination to serve a request (e.g., outside circles of specified radius centered on the origin and destination nodes) may be removed from consideration. The resulting sets of origin and destination nodes for each request define possible itineraries for servicing that request (e.g., each possible pair of origin and destination node). This sets up an optimization problem to find a subset of the candidate nodes that achieves one or more objectives (e.g., maximizing time saving, maximizing the number of requests serviced at least in part via VTOL aircraft 120, etc.).

In an embodiment that aims to maximize the number of requests serviced at least in part via VTOL aircraft 120, the node selection module 520 may model the servicing of hypothetical transport requests and apply a set of constraints to find a solution (e.g., a set of locations to place nodes) that is consistent with the objective of maximizing the number of requests serviced at least in part by VTOL aircraft 120. The solution may be a global maximum, a local maximum, or an approximation of either. For example, the set of constraints may: (1) seek to minimize the uncovered requests (or, equivalently, to maximize the set of requests that can be serviced at least in part by VTOL aircraft 120). Constraint (7) ensures that all requests are either assigned to either a VTOL itinerary or a ground-based itinerary. Constraint (8) imposes a cardinality constraint to pick the desired number of candidate nodes. The constraints in (9) link the selection of nodes with eligible itineraries. Note that requests are only assigned to itineraries for which both the origin and destination nodes are included in the selected subset.

In one embodiment, instead of using a time threshold to determine whether VTOL itineraries are considered, the node selection module 520 considers the probability that a request will ultimately be serviced at least in part by VTOL (e.g., that the user would select VTOL transport over all other available options, as indicated by the transportation data 203). The node selection module 520 may select the subset of candidate nodes with the goal of maximizing the number of requests expected to be serviced at least in part by a VTOL aircraft 120. Because this approach considers the probabilities that itineraries will ultimately be serviced at least in part by a VTOL aircraft 120, it may capture behavior that would otherwise be missed. For example, an approach based on a threshold amount of time saved will miss instances where a time-sensitive user selects VTOL transportation despite the time savings being less than the threshold. In contrast, a probability-based approach will capture this possibility as the probability of such requests being serviced at least in part by VTOL aircraft 120 will be non-zero (albeit relatively small).

In other embodiments, stochastic optimization is used to select a subset of the candidate node locations. For example, in one such embodiment, the node selection module 520 uses a two-stage stochastic program is which a first-stage decision is made using an uncertainty set and a second-stage decision is made based on a specific realization in view of the first-stage decision. In particular, the first stage determines which candidate node locations are selected with the uncertainty set being simulated realized outcomes based on the probabilities of the trips being serviced at least in part by a VTOL aircraft 120 (e.g., using random numbers). The second stage assigns itineraries to requests using the node locations identified in the first step to determine the amount of demand captured by the solution (e.g., as described below, with reference to the route optimization subsystem 240). A sample average approximation (SAA) method may be used to reduce the complexity of the problem defined using the two-stage stochastic program.

The node classification module 530 assigns recommended types to the nodes in the subset identified by the node selection module 520. The node classification module 530 may define the expected throughout of each selected node based on the itineraries that include the node as either an origin or destination of a VTOL-serviced leg. The throughput may be an average number of requests serviced per hour, per day, etc. Alternatively, the throughput may be an expected maximum number of requests serviced in a given time period (e.g., the number of expected requests in the busiest hour of the day for that node, which may be different for different nodes).

In one embodiment, the node classification module 530 assigns a recommended type to each node based on the expected throughputs. The types may be selected from a set of pre-determined designs to provide uniformity and reduce design and construction costs. For example, there may be small, medium, and large node designs, with the capacities to handle take off/landing of one, four, and sixteen VTOL aircraft 120 simultaneously (or approximately simultaneously), respectively. Alternatively, the node classification module 530 may assign a number of VTOL aircraft 120 that each node should be able to take off/land simultaneously (or approximately simultaneously) at the node. In either case, the classification may take into account a prediction of future growth in demand.

The node classification module 530 may also indicate how many VTOL charging stations should be available at each node (including zero). In one embodiment, the charging facilities available are tied to the type of the node. E.g., a large node may have four charging stations, a medium node, one, and a small node, zero. Alternatively or additionally, the node classification module 530 may consider the distance between the node and other nodes where charging stations are available. For example, a small node located at the edge of the transport network, a large distance away from other nodes, may include a charging station even though most small nodes do not. In another embodiment, the number or proportion of each type of node is set by a user (e.g., via the parameter selection module 510) and the node classification module 530 selects which nodes should be of which type accordingly. For example, if the user indicates that there should be five large nodes, the parameter selection module 510 might select the five nodes in the subset that have the largest throughput as the large nodes, etc.

The node visualization module 540 (if included) presents the selected node locations to the user. In one embodiment, the node visualization module 540 overlays indicators of the selected node locations on a map of the geographic region. The type of each node may be indicated by variations in size, color, shape, or the like of the indicators. For example, each node location may be indicated by a black circle with the size of the circle corresponding to the type of node (e.g., a larger circle is a larger node). Alternatively, the type of node and/or additional information (e.g., expected throughout) may be provided next to the indicator or in response to the user selecting the indicator (e.g., by clicking on it). Similarly, where the nodes are to be built in multiple phases, a property of the indicators may indicate which phase of construction each node is in (e.g., the first phase nodes might be red while second phase nodes might be blue, etc.). The node visualization module 540 may also provide a user interface for altering the selected node locations. For example, in one embodiment, the user can add, remove, or relocate nodes as well as change the type and construction phase of each node.

The nodes store 550 is one or more computer-readable media configured to store the locations for nodes and corresponding data (e.g., types, throughput, etc.). It may also store a local copy of the candidate node locations and/or estimated demand data for more efficient data processing. Although it is depicted as a single entity within the node optimization subsystem 230, it may be spread across multiple computing devices.

Figure 6:
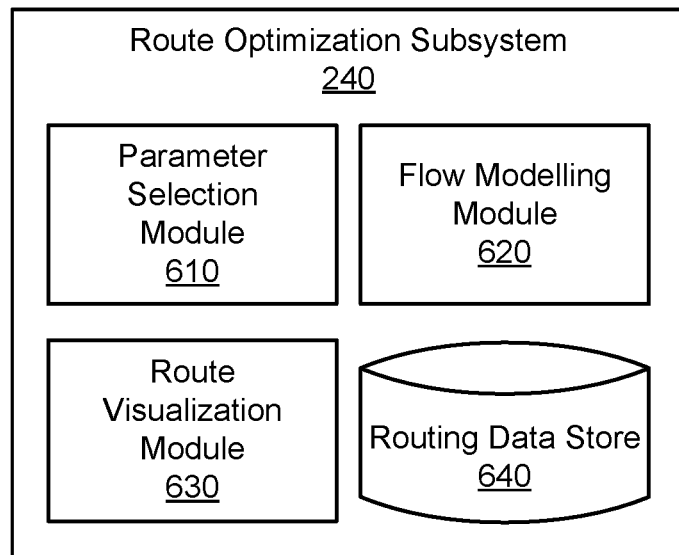
FIG. 6 is a high-level block diagram illustrating the route optimization subsystem shown in FIG. 2, according to one embodiment.

FIG. 6 illustrates one embodiment of the route optimization subsystem 240. The route optimization subsystem models the flow of VTOL aircraft 120 and riders through the transport network. In the embodiment shown in FIG. 6, the route optimization subsystem 240 includes a parameter selection module 610, a flow modelling module 620, a route visualization module 630, and a routing data store 640. In other embodiments, the route optimization subsystem 240 contains different and/or additional elements. In addition, the functions may be distributed among the elements in a different manner than described.

The parameter selection module 610 (like its counterparts in the candidate node identification subsystem 220 and node optimization subsystem 230) provides a user interface for defining various parameters to be used in modelling the transport network. In one embodiment, the definable parameters include VTOL parameters and objectives. The VTOL parameters may include the number of available VTOL aircraft 120 and, where multiple types are available, their type or types. For each VTOL type, the VTOL parameters may include en route speed, time to ascend, number of seats, whether the VTOL aircraft 120 is autonomous, maximum flying range, battery consumption rate when cruising, battery consumption for take-off and landing, battery recharging rate, whether the battery may be switched at a node and how long switching takes, and the like.

The objective may be to: (1) maximize the expected number of people transported; (2) maximize use of VTOL aircraft 120 (e.g., use as few VTOL aircraft as possible while minimizing time each spends on the ground); (3) minimize the total costs of operations, including passenger movement costs (e.g., a per-minute penalty for itineraries longer than the minimum possible), VTOL usage costs (e.g., a penalty for under-utilized VTOL legs), and VTOL aircraft repositioning costs (either to other nodes or within a node, such as from a landing pad to a storage area); or (4) maximize total profitability of the system. Other objectives and VTOL parameters may also be used.

The flow modelling module 620 determines the routing of VTOL aircraft 120 and riders through the transport network, trying to maximize efficiency in view if the selected objective. In various embodiments, the flow modelling module 620 discretizes time into segments (e.g., one minute, five minutes, etc.) and calculates an optimum or substantially optimum routing for the fleet of VTOLs 120 for each segment. The flow modelling module 620 solves the resulting multi-commodity network flow problem (riders and VTOL aircraft 120 are both commodities in the model) to determine how each VTOL aircraft should be routed to meet the selected objective.

In one embodiment, the network flow model is defined as follows:

M: The set of VTOL aircraft.
N: The set of all nodes.
P: The set of passengers.
H: The set of nodes.
$S_{it}^n$: The supply (+) or demand (−) or transit (0) of number of passengers o group n at node i at time t.
$V_{it}$: The supply (+) or demand (−) or transit (0) of number of VTOL aircraft at node i at time t.
(it, jt̄): Arc that travels from node i at time t and arrives at node j at time t̄.
In(it): The set of arcs coming into node i at time t.
Out(it): The set of arcs going out from node i at time t.
A: The set of all arcs (flight arcs and ground arcs).
TA: The set of VTOL transit arcs.
$G_i$: The set of ground arcs for the $i^{th}$ node.
U: The set of arcs for requests served by ground-based transport.
T: The set of all time periods.
$x_i^m$: Whether VTOL aircraft m travels arc i.
$y_i^p$: The number of passengers in group p that travels arc i.
$z_t^m$: The battery level of VTOL aircraft m at time t.
$E_i$: The battery consumption (if flying) or charging (if on the ground) for a VTOL aircraft to travel arc i.
VC: The passenger capacity of a VTOL aircraft.
$HC_i$: The capacity of the $i^{th}$ node.
B: The max battery level of a VTOL aircraft.
$R_i$: The cost of repositioning a VTOL aircraft by arc i.
$C_i$: The cost of travelling arc i.

Using the above definitions, the model may be defined by the following constraints:

$$\max \sum_{p \in P} \sum_{i \in FA} y_i^p \quad (15)$$

$$\text{s.t.} - \sum_{j \in In(it)} y_j^p + \sum_{k \in Out(it)} y_k^p = S_{it}^p \; \forall \, i \in N, \forall \, t \in T, \forall \, p \in P \quad (16)$$

$$V_{i1} - \sum_{m \in M} \sum_{a \in Out(it)} x_a^m = 0 \; \forall \, i \in H \quad (17)$$

$$\sum_{a \in Out(it)} x_a^m - \sum_{b \in In(it)} x_b^m = 0 \; \forall \, i \in H, \forall \, t \in T, \forall \, m \in M \quad (18)$$

$$\overline{V}_{iT} + \sum_{m \in M} \sum_{b \in In(it)} x_b^m = 0 \; \forall \, i \in H \quad (19)$$

$$\sum_{m \in M} x_i^m \leq HC_j \; \forall \, i \in G_j, \forall \, j \in H \quad (20)$$

$$\sum_{p \in P} y_j^p \leq \sum_{m \in M} x_j^m \; \forall \, j \in A \quad (21)$$

-continued $$x_a^m \in \{0, 1\} \; \forall \, a \in A \qquad (22)$$

$$y_a^p \in \{0, 1\} \; \forall \, a \in A \qquad (23)$$

The network flow module 620 may solve the model to meet a specified objective, such as:

Maximum Time Savings:

$$\max \sum_{p \in P} \left( T^p - \sum_{i \in A} T_i y_i^p \right) \qquad (24)$$

Maximum VTOL Aircraft Utilization:

$$\max \sum_{m \in M} x^m \qquad (25)$$

$$x^m \le \sum_{a \in FA} x_a^m, \; \forall \, m \in M \qquad (26)$$

Minimum Total Cost (Travel Cost, Repositioning Cost, Etc.):

$$\min \sum_{p \in P} \sum_{i \in TA} R_i(x_i^p - y_i^p) + \sum_{p \in P} \sum_{i \in A} C_i y_i^p + \sum_{m \in M} q^m \qquad (27)$$

$$x_a^m \le q^m \; \forall \, a \in TA, \, \forall \, m \in M \qquad (28)$$

The model used by the network flow module 620 may also be defined as a path-based model:

$$\min \sum_{r \in R} u^r \qquad (29)$$

$$\text{s.t.} \sum_{p \in P(r)} y_p^r + u^r = 1 \; \forall \, r \in R \qquad (30)$$

$$\sum_{r \in R} \sum_{p \in P(r)} \delta_{ij}^p y_p^r \le \sum_{v \in V} C^v \sum_{p \in P(v)} \delta_{ij}^{\bar p} x_p^v \; \forall \, ij \in A \qquad (31)$$

$$\sum_{p \in P(v)} x_p^v = 1 \; \forall \, v \in V \qquad (32)$$

$$\sum_{v \in V} \sum_{p \in P(v)} \delta_{ij}^{\bar p} x_p^v \le HC_{ij} \; \forall \, ij \in G \qquad (33)$$

$$x_p^v \in \{0, 1\} \; \forall \, p \in P(v) \qquad (34)$$

$$y_p^r \in \{0, 1\} \; \forall \, a \in A \qquad (35)$$

$$u^r \in \{0, 1\} \; \forall \, r \in R \qquad (36)$$

which results in a reduced cost per column of $$-\sum_{ij \in A} \alpha_{ij} C^v \delta_{ij}^{\bar p} - \beta_v \qquad (37)$$

Thus, the network flow module 620 can determines how to route VTOL aircraft 120 through the transport network by finding the shortest path using negative weights and fuel constraints. In this embodiment, the ground arcs have weights of $-\alpha_{ij} C^v - y_{ij}$ and other arcs will have the weights $-\alpha_{ij} C^v$. In one embodiment, the network flow module 620 considers servicing each transport request via VTOL and each of multiple modes of ground transportation. The network flow module 620 may determine which mode of transport (including VTOL) is likely to be used to service each request. The network flow module 620 may calculate a probability of each request being serviced by each mode of transport based on factors such as: the origin, the destination, the time, convenience (e.g., ingress and egress times), demographics, and the like.

In other embodiments, the probabilities that requests for transport services between origins and destinations generated by the demand estimation subsystem 210 may be used to simulate the routing of VTOL aircraft 120 and riders through the network. In one embodiment, the flow modelling module 620 determines whether each request will be serviced at least in part by a VTOL aircraft 120 based on the corresponding. The requests that are not selected for VTOL servicing may be eliminated, leaving a subset of requests each including an origin zone, destination zone, and time block (e.g., a particular hour). The flow modelling module 620 may generate an actual start time within the time block (e.g., a particular minute). The actual start time may be selected randomly within the time block or the time selected may be weighted based on data indicating the typical distribution of requests in the time block (e.g., from the service data 202) and/or resource allocation considerations (e.g., amount of energy required, expected duration of charging, availability of VTOL aircraft 120, etc.). The flow modelling module 620 may then use a stochastic approach to route the VTOL aircraft 120 through the transport network to service the identified subset of the requests.

In further embodiments, the flow modelling module 620 uses an itinerary degradation approach to determine which requests are serviced at least in part with a VTOL aircraft 120. The flow modelling module 620 may initially set a wait time for each request to small, nominal value (e.g., 30 seconds) and then route the VTOL aircraft 120 through the transportation network to service the requests using a policy designed to limit waiting times. Note that this policy may result in some requests initially designated to be serviced at least in part with a VTOL aircraft 120 ultimately being serviced entirely by ground-based transportation.

In one such embodiment, the policy is defined in terms of a probability function p(r,w) where r is a request and w is the length of the rider's wait (e.g., in seconds) if the request is serviced at least in part by a VTOL aircraft 120. The policy may be implemented by finding w* such that p(t, $\overline{w}$)−p(t, w*)=0.1 p(t, $\overline{w}$). This may be solved in closed form where $\overline{w}$ is the nominal waiting time assigned previously. The flow modelling module 620 may then use a stochastic approach to route the VTOL aircraft 120 through the transport network to service the identified subset of the requests.

The route visualization module 630 presents the results of modelling the flow of VTOL aircraft 120 and riders within the transport network to the user. In one embodiment, the results are presented as a set of summary statistics including the number of VTOL aircraft 120 in the fleet, a VTOL utilization percentage (e.g., the percentage of available seats on VTOL legs that were filled), an average time saved for requests serviced by VTOL aircraft (e.g., as a percentage of the ground-only equivalent time), the total number of riders served by VTOL aircraft in the period modelled. In other embodiments, the summary statistics may include different or additional information.

In addition, the route visualization module 630 may present a timeline indicating how demand varied by node and over time. In one embodiment, if the user selects a particular time (e.g., by clicking on the corresponding point on the timeline), the route visualization module 630 presents a visualization of state of the transport network at that time, such as by overlaying the flight path of each VTOL aircraft 120 in the air at that point over a map of the geographic area Furthermore, if the user selects a node, the route visualization module 630 may provide information about the selected node, such as a number of incoming and outgoing VTOL aircraft 120, a number of passengers waiting to board a VTOL aircraft at the node, a number of unoccupied landing pads at the node, and the like. Similarly, if the user selects a VTOL flightpath, information about the corresponding VTOL aircraft 120 and the flightpath may be shown (e.g., an identifier of the particular VTOL aircraft, identifiers of the riders currently being serviced, origin and destination nodes, battery charge remaining, and time remaining to arrival).

The visualizations provided by the route visualization module 630 may help the user gain a deeper understanding of the transport network and identify potential problems and improvements before construction of the actual infrastructure begins. For example, the user may be able to identify potential choke points in the transport network, either in the form of overburdened nodes or time periods where demand is likely to exceed the number of available VTOL aircraft 120. The visualizations may also help the user understand how much time will be saved for riders and how many riders will be served, which in turn may be used to estimate how traffic congestion may be alleviated.

The routing data store 640 stores data used and/or generated by the route optimization subsystem. In one embodiment, the routing data store 640 stores the results of each simulation performed by the flow modelling module 620. Thus, a user may perform multiple simulations using different parameters and then compare the results at a later time. The routing data store 640 may additionally or alternatively store local copies of the data used to model the transport network, such as the node locations generated by the node optimization subsystem 230 and the demand data generated by the demand estimation subsystem 210.

Transport Services Coordination

Figure 7:
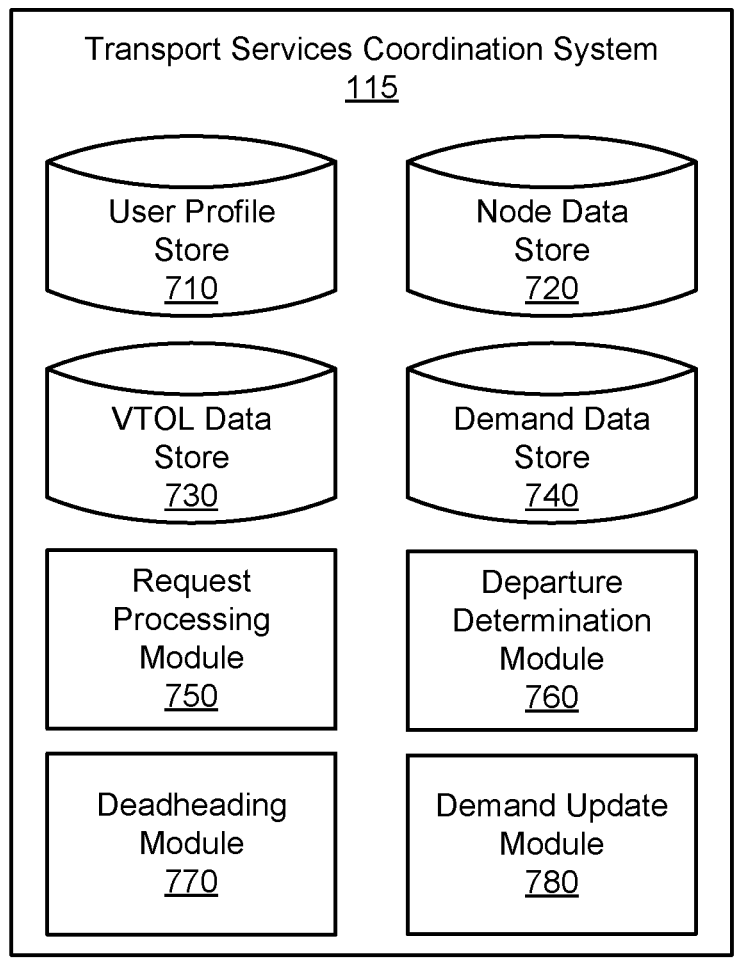
FIG. 7 is a high-level block diagram illustrating the transport services coordination system shown in FIG. 1, according to one embodiment.

FIG. 7 illustrates one embodiment of the transport services coordination system 115. The transport services coordination system 115 services requests for transport services from riders by pairing them with itineraries. An itinerary is a set of one or more interconnected travel legs that collectively begin at an origin specified in a request and end at a destination specified in the request. The legs may be entirely ground-based (including walking) or involve one or more VTOL-serviced legs. In the embodiment shown in FIG. 7, the transport services coordination system 115 includes a rider profile store 710, a node data store 720, a VTOL data store 730, a demand data store 740, a request processing module 750, a departure determination module 760, a deadheading module 770, and a demand update module 780. In other embodiments, the transport services coordination system 115 contains different and/or additional elements. In addition, the functions may be distributed among the elements in a different manner than described.

The rider profile store 710 is one or more computer-readable media configured to store rider profile data. In one embodiment, each rider sets up a rider profile with the transport services coordination system 115 (e.g., using an app running on a client device 140). In one embodiment, a rider profile includes an identifier of the rider (e.g., a unique ID number) and information provided by the rider, such as a name, a weight, payment information (e.g., a credit card to which fees for transport services should be charge), a profile picture, and the like. The rider profile may also include preferences, such as availability of Wi-Fi on VTOL aircraft 120, a preferred direction for seats to face, and the like.

The node data store 720 is one or more computer-readable media configured to store information about the nodes in the transport network. In one embodiment, the information about a given node includes: an identifier of the node (e.g., a name or ID number), a location (e.g., latitude and longitude, GPS coordinate, etc.), the number of VTOL launch pads at the node, and the number of VTOL storage bays at the node, the number of charging stations available at the node (which may be zero). In other embodiments, the information about a given node may include different or additional information.

The VTOL data store 730 is one or more computer-readable media configured to store information about the VTOL aircraft 120 available in the transport network. In one embodiment, the information about a given VTOL aircraft 120 includes: an identifier of the VTOL (e.g., a name or ID number), a current (or most recently reported) location, the number of seats available to riders, a maximum load weight capacity, a maximum flight length, a current (or most recently reported) battery level, a current destination node, a list of currently assigned riders, a list of riders currently aboard, and the like. Current information for a such as location, battery state of charge, and riders currently aboard may be provided by a computer system aboard the VTOL aircraft 120 or may be reported by a node management system 130 when the VTOL aircraft takes off from the corresponding node and then estimated based on a time since departure. For example, the current battery state of charge of the VTOL aircraft 120 may be estimated by assuming it depletes at an expected rate.

The demand data store 740 is one or more computer-readable media configured to store information about demand for VTOL transport services (demand data). In various embodiments, the demand data includes an expected number of requests for each pair of nodes in the transport network in a given time period and corresponding probabilities that the requests will be serviced at least in part by a VTOL aircraft 120. For example, the demand data might indicate that ten riders per hour are expected to travel from Node X to Node Y at hour t, while only four riders an hour are expected to travel from Node Y to Node X at hour t.

The expected number of riders between two nodes may be an overall average. Alternatively, the demand data store 740 may store multiple values for each pair of nodes corresponding to different time periods, such as one value for each hour of the day. The demand data may also distinguish between weekends and weekdays, different days of the week, different months of the year, etc., storing different sets of values for each. For example, for a given node, the demand data might include an expected number of riders for each hour of the day on weekdays and each hour of the day on weekends.

In one embodiment, the demand estimation subsystem 210 may be used to provide the initial demand data. The initial demand data may later be replaced or augmented by demand data based on actual use of the VTOL aircraft 120 in the transport network. For example, once the VTOL aircraft 120 have been actively servicing transport requests for a given time period (e.g., one month) the initial demand data might be replaced with estimates based on actual use data. Alternatively, the actual use data might be incorporated over time using weighting factors to combine the initial demand data with actual use data. Various processes for updating the demand data are described in greater detail below, with reference to the demand update module 780.

The request processing module 750 processes requests for transport services from riders and pairs those riders with itineraries. In various embodiments, a rider requests transport services using a client device 140 (e.g., via an app). The request includes an origin and a destination. The origin may be entered by the rider or determined from the location of the client device 140 (e.g., as established from GPS data). The request processing module 750 establishes an itinerary for the rider, which may include a single ground-based leg or a pair of ground-based legs either side of a VTOL leg (as described previously). In some instances, one or both of the ground-based legs on either side of a VTOL leg may be omitted (e.g, an itinerary may be from one node to another). In other embodiments, itineraries may include additional legs. For example, an itinerary might include two VTOL legs with a "layover" at a node in between.

In one embodiment, the request processing module 750 determines a ground-based itinerary and a VTOL itinerary and selects the VTOL itinerary if it is predicted to save more than a threshold amount of time relative to the ground-based itinerary (e.g., 40%). Alternatively, the request processing module 750 may always provide the option of having a request serviced at least in part by a VTOL aircraft 120, provide the VTOL option whenever it will save any amount of time, and/or if the probability of the rider selecting the VTOL option (e.g., calculated as described previously with reference to the demand estimation subsystem 210) exceeds a threshold. In some instances, the fastest VTOL itinerary might not depart from the node nearest the origin or arrive at the node nearest the destination. For example, traffic or road layout may make traveling from the origin to a geographically close departure node take longer than reaching a node that is further away, or there may not be a VTOL aircraft 120 available at the nearest node, etc. Therefore, the request processing module 750 may consider each departure node and arrival node within a threshold distance of the origin and destination, respectively, and determine an itinerary for each. An itinerary may then be selected, such as the itinerary with the earliest arrival time at the destination or an itinerary for which every seat in the VTOL aircraft 120 is used that has an arrival time within a threshold period after the earliest arrival time of any itinerary (e.g., no more than fifteen minutes later), etc. If the rider's profile includes preferences, a penalty may be applied to itineraries that do not comply with those preference. For example, if the rider prefers forward-facing seats, the shortest itinerary might be rejected if it includes a leg with a backward facing seat and a slightly longer itinerary with all forward-facing seats is available. In other embodiments, other ways of pairing riders with itineraries may be used.

Regardless of how the itinerary is generated and selected, the request processing module 750 sends itinerary information to the rider (e.g., to the rider's client device 140). In one embodiment, the itinerary information for a VTOL-serviced request identifies a ground-based vehicle that will pick the rider up at their origin (or instructs the rider to walk to the departure node), identifies a VTOL aircraft 120 the rider should board, and identifies a ground-based vehicle that will drop the rider off at their destination (or instructs the rider to walk to the destination from the arrival node). In the case of one or more of the legs being walking legs, the rider's client device 140 may provide walking directions to the rider. In another embodiment, the precise VTOL 120 or ground-based vehicle that will service the second and third leg of the itinerary, respectively, may not be identified until the rider is en route. For example, the request processing module 750 may not identify the specific ground-based vehicle that will pick the rider up at the arrival node until the VTOL-serviced leg is underway. This may allow greater flexibility in the transport network.

The request processing module 750 also sends instructions to the vehicle or vehicles that will service the itinerary. In one embodiment, for a VTOL leg, the request processing module 750 sends information about the rider (e.g., the rider's identity, a picture of the rider, etc.) as well as an expected boarding time for the rider and the destination node to a computer-system of the VTOL aircraft 120. If the VTOL aircraft 120 is not already located at or en route to the departure node, the request processing module 750 may also direct the VTOL aircraft to go to that node (e.g., as a deadhead flight or with less than a full complement of riders). Alternatively, the information may be sent to a client device 140 associated with the pilot of the VTOL aircraft 120 (assuming it has one).

For ground-based legs, the request processing module 750 may similarly send instructions to a ground-based vehicle (or a client device 140 associated with the driver of the vehicle) identifying the rider as well as pick-up and drop-off locations. Alternatively, the request processing module 750 may send out an invitation to one or more vehicles (or driver client devices 140) to provide the transport services. In this case, the rider is paired with a vehicle for which the driver accepts the invitation. For example, the first leg of an itinerary from a rider's origin to the departure node may be serviced by a car via a ridesharing service.

When the rider arrives at the departure node, the rider boards the identified VTOL aircraft 120. The boarding process may include verifying information about the rider, such as weighing the rider with a stand-one scale. Any luggage the rider has may also be weighed. The weight of the rider and luggage may be used to more accurately forecast the amount of battery power the VTOL flight will require and also help ensure that the VTOL aircraft 120 is not excessively unbalanced (e.g., with heavier riders and luggage all located on the same side of the VTOL aircraft).

The departure determination module 760 determines whether the VTOL aircraft 120 should take-off immediately or wait for additional riders. This determination may be made at the time the request processing module 750 receives the request, once the rider has boarded the VTOL aircraft 120, or at any other suitable time. In various embodiments, when the rider completes boarding, a confirmation message is sent to the departure determination module 760 (e.g., via the network 170). The confirmation message may also include information about the rider, such as the weight of any luggage and what seat the rider is sat in.

The departure determination module 760 balances providing the minimum possible journey time for the rider already boarded (by leaving immediately) with potential savings in average journey time, total battery usage, wear and tear, and the like, that may be realized by waiting for additional people to be paired with the VTOL aircraft 120. In various embodiments, if the VTOL 120 is full (i.e., every seat is taken), the departure determination module 760 instructs it to leave immediately. Otherwise, the departure determination module 760 determines the likelihood that another rider will be able to be paired with the VTOL aircraft 120 in a specified time period.

In one embodiment, the time period is set such that, if the VTOL aircraft 120 departs at the end of that time period, the rider already on board would still save at least the threshold amount of time (e.g., 40%) over taking ground-based transportation alone. If another rider has already submitted a request that may be serviced by the VTOL aircraft 120, the departure determination module 760 estimates the arrival time at the node for that rider and, accounting for the time required for boarding, determines whether the VTOL aircraft 120 can wait and still save the rider who has already boarded at least the threshold amount of time. In the case where more than one rider has already boarded, the departure determination module 760 may perform this analysis for each boarded rider and instructs the VTOL aircraft 120 to take-off if waiting for the additional rider would reduce the time saved for any already boarded rider below the threshold.

If no such request has been submitted, the departure determination module 760 can use the demand data (e.g., retrieved from the demand data store 740) to calculate the probability of another rider arriving at the node with the same destination before the VTOL aircraft 120 must leave to save at least the threshold amount of time for the rider who is already boarded. The VTOL aircraft 120 may be instructed to wait if this probability exceeds a threshold (e.g., 80%). This threshold may be fixed or set by an operator of the transport network. Alternatively or additionally, the rider who is already boarded may be offered a discount based on the time spent waiting for additional riders. For example, the fee for the itinerary might be a certain amount if the rider's travel duration is reduced by 40% or more over ground-based transportation and reduced proportionally with the degree to which that target is not met (e.g., if the travel time is reduced by only 30%, the fee might be reduced by 10%). Alternatively, if the VTOL aircraft 120 initially waits and no further riders have shown up by the time it needs to depart to save the rider who is already boarded 40% on travel time, the VTOL aircraft may depart at that point. In another embodiment, a boarded rider may opt to pay a premium to have the VTOL aircraft 120 leave without waiting.

The deadheading module 770 determines if and when to relocate VTOL aircraft 120 within the transport network without riders on board. In one embodiment, the deadheading module 770 predicts the future distribution of VTOL aircraft 120 in the network based on their current position, existing itineraries, and expected demand (e.g., a prediction of future itineraries). The future distribution of VTOL aircraft 120 can be compared to the expected demand at each node (e.g., as stored in the demand data store 740). Based on the comparison, the deadheading module 770 may assign a score to each node indicating to what extent the distribution of VTOL aircraft 120 may not meet the demand in a given time period (e.g., the next hour). For example, a node might have a score of four if the deadheading module 770 estimates that four requests will not be serviced by a VTOL aircraft 120 in the given time period due to a lack of VTOL aircraft at the node. The deadheading module 770 may also assign a score to each VTOL aircraft 120 indicating the likelihood that it will not be assigned to service any transport requests if it remains at its current location (or at the location it is currently flying towards, once it has arrived).

The deadheading module 770 determines an overall cost in the network by combining the scores for nodes that are predicted to have unmet demand and the scores indicating likelihood that a VTOL aircraft 120 will remain on the ground. The deadheading module 770 may then apply a network flow analysis to try and minimize the combined score. The components of the score may be weighted depending on the objectives of the operator of the transport network. For example, applying a low weighting to the scores for VTOL aircraft 120 or a high weighting to nodes with unmet demand will reduce total battery at the expense of servicing less transport requests and/or reducing the time savings realized and vice versa. The weightings may predetermined or set by an operator of the transport network. Where an operator sets the weightings, the deadheading module 770 may give the operators a choice from several presets, such as maximize VTOL usage, maximize transport request coverage, and balanced, and determine the weightings to use based on the selected preset. In other embodiments, different approaches to determining when to relocate VTOL aircraft 120 using deadhead legs may be used. For example, the deadheading module 770 may send an instruction indicating a VTOL aircraft 120 should relocate from its current node to another node without any riders to make space available at the current node for a different VTOL aircraft to land.

The demand update module 780 updates the demand data based on information regarding actual transport requests serviced by the transport services coordination system 115. In one embodiment, the demand update module 780 uses data about the transport requests serviced to build a training set and train a machine-learning module (e.g., a neural network). The demand update module 780 divides the data about transport requests serviced into periods of a given length (e.g., one hour) and defines a feature vector for each node in each period. For example, each feature vector might include: an identifier of the node, an hour of the day, a day of the week, a month of the year, proximity to special events (e.g., public holidays, sporting events, parades, etc.), maintenance information (e.g., a number of chargers or launch pads unavailable), and the like. These feature vectors can be labelled with the actual demand (i.e., the number of transport requests serviced) through the node in the corresponding time period. The machine-learning model can then be trained by minimizing a loss function to reproduce the actual demand from the feature vectors as closely as possible.

The demand update module 780 may also validate the trained model to avoid training bias. For example, the model might be trained on the demand data for one year and then validated by applying it to the data for January of the next year to see if it still provides an accurate prediction of the demand at each node.

As described previously, the transport services coordination system 115 may initially use the hypothetical demand data generated by the demand estimation subsystem 210 during network planning. As more actual data becomes available, the transport services coordination system 115 may transition to using the demand estimates generated from the servicing of actual transport requests. In one embodiment, a hard cross-over may be made to a machine-learned model once it has been validated to the satisfaction of an operator of the transport network (e.g., if the model is consistently 90% accurate or better over a one month period). In another embodiment, the hypothetical demand data is combined with the output from the machine-learned model with the model gradually being weighted more heavily over time. In other embodiments, other approaches to updating the demand data may be used.

Computing System Architecture

Figure 8:
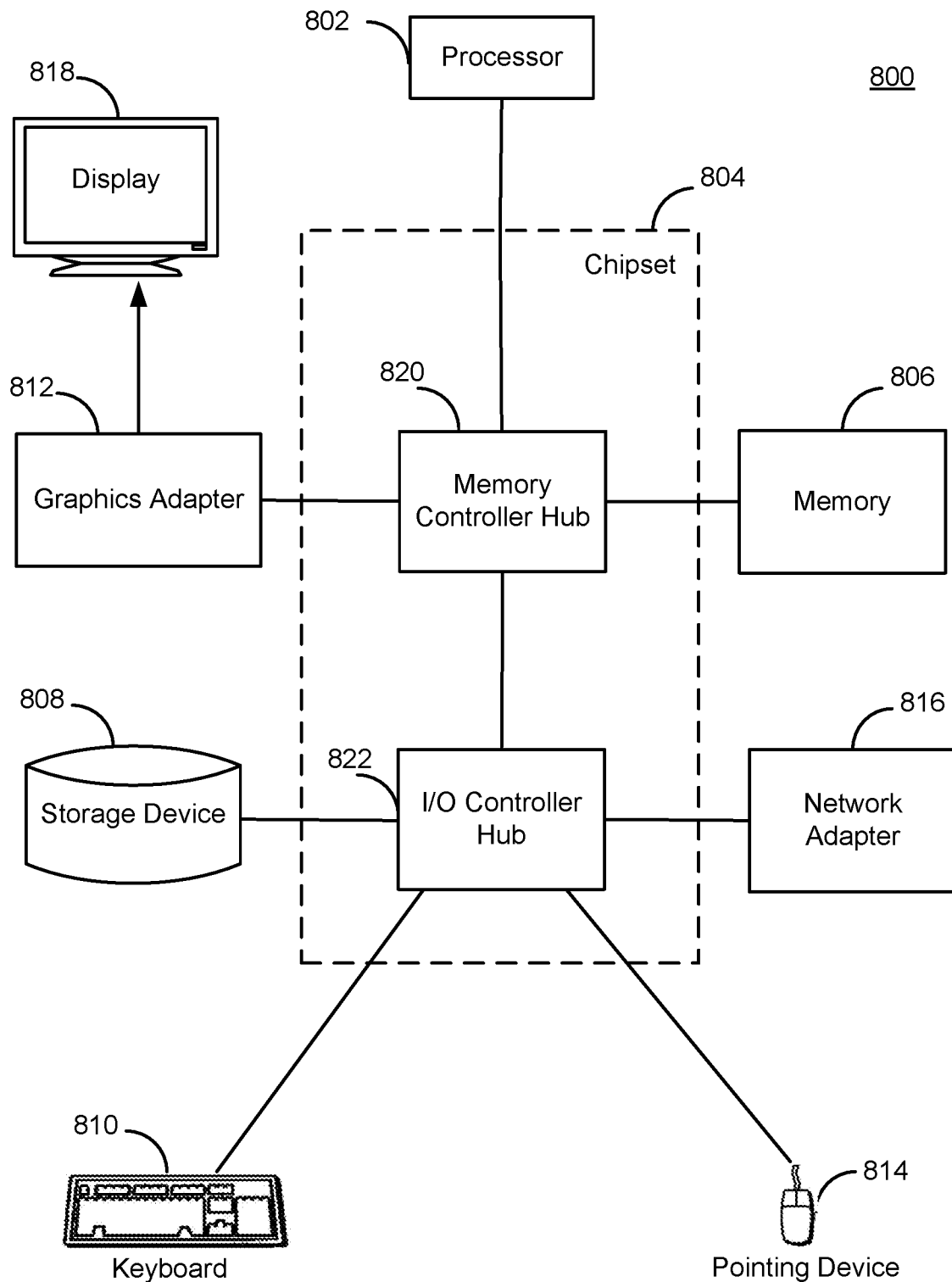
FIG. 8 is a high-level block diagram illustrating an example of a computer suitable for use in the computing environment of FIG. 1, according to one embodiment.

FIG. 8 is a high-level block diagram illustrating an example computer 800 suitable for use within the computing environment 100. The example computer 800 includes at least one processor 802 coupled to a chipset 804. The chipset 804 includes a memory controller hub 820 and an input/output (I/O) controller hub 822. A memory 806 and a graphics adapter 812 are coupled to the memory controller hub 820, and a display 818 is coupled to the graphics adapter 812. A storage device 808, keyboard 810, pointing device 814, and network adapter 816 are coupled to the I/O controller hub 822. Other embodiments of the computer 800 have different architectures.

In the embodiment shown in FIG. 8, the storage device 808 is a non-transitory computer-readable storage medium such as a hard drive, compact disk read-only memory (CD-ROM), DVD, or a solid-state memory device. The memory 806 holds instructions and data used by the processor 802. The pointing device 814 is a mouse, track ball, touch-screen, or other type of pointing device, and is used in combination with the keyboard 810 (which may be an on-screen keyboard) to input data into the computer system 800. The graphics adapter 812 displays images and other information on the display 818. The network adapter 816 couples the computer system 800 to one or more computer networks.

The types of computers used by the entities of FIGS. 1 through 7 can vary depending upon the embodiment and the processing power required by the entity. For example, the transport services coordination system 115 might include multiple computers 800 working together to provide the functionality described. Furthermore, the computers 800 can lack some of the components described above, such as keyboards 810, graphics adapters 812, and displays 818.

Example Methods

Figure 9:
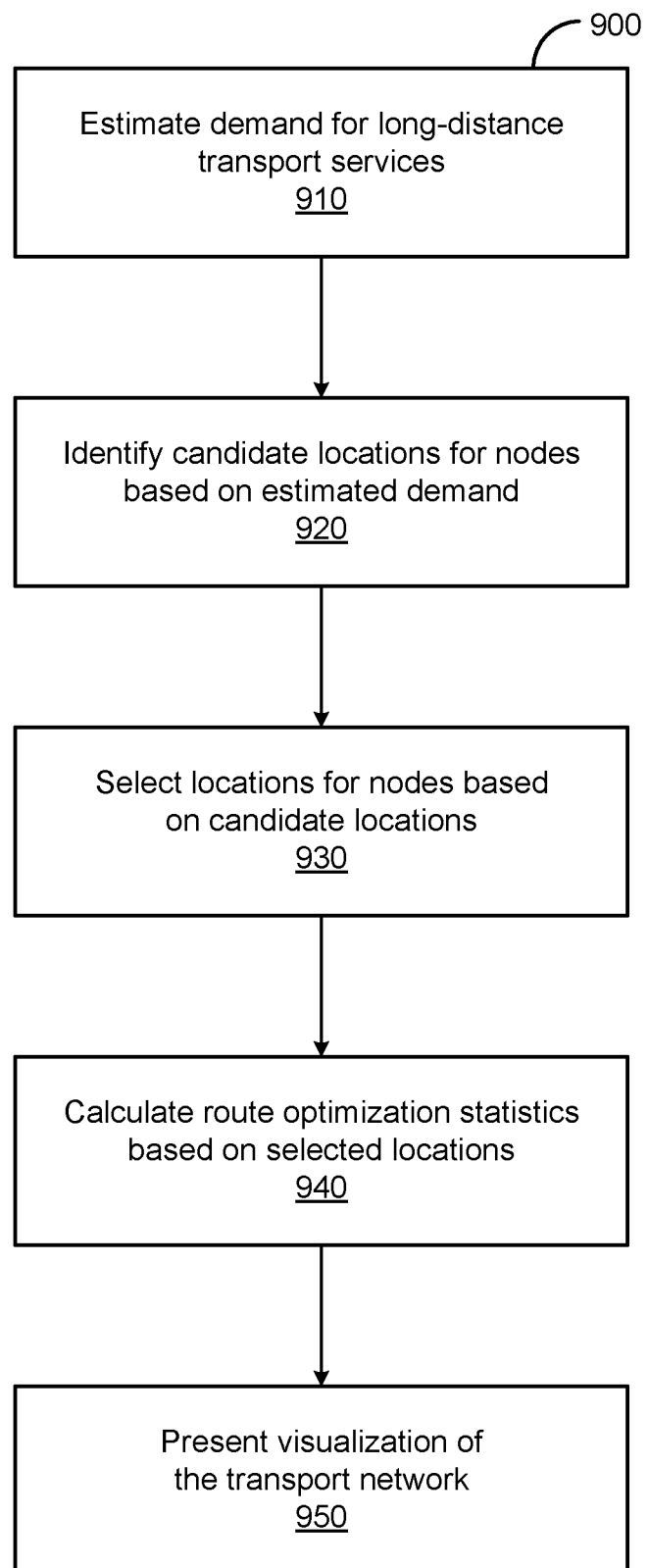
FIG. 9 is a flow-chart illustrating a method for planning a transport network, according to one embodiment.

FIG. 9 illustrates one embodiment of a method 900 for planning an aviation transport network. The steps of FIG. 9 are illustrated from the perspective of the transport network planning system 110 performing the method 900. However, some or all of the steps may be performed by other entities or components. In addition, some embodiments may perform the steps in parallel, perform the steps in different orders, or perform different steps.

In the embodiment shown in FIG. 9, the method 900 begins with the transport network planning system 110 estimating 910 demand for long-distance (e.g., 20 to 120 miles) transport services. The estimated demand is a set of hypothetical transport requests, each including an origin, a destination, and a request time. As described previously, the hypothetical transport requests may be based on historical requests for long-distance transport services using ground-based transportation. In one embodiment, the historical requests are used as the hypothetical requests. In another embodiment, a set of hypothetical transport requests is generated with a similar distribution as the historical requests, with adjustments applied for factors such as expected population growth, expected increase in demand once VTOL aircraft 120 become available, and the like.

The transport network planning system 110 identifies 920 the candidate locations for nodes based on the estimated demand. As described previously, the transport network planning system 110 may cluster the origins and destinations of transport requests (e.g., using k-mean clustering) and identify 920 the centroid of each cluster as a candidate location. In one embodiment, the transport network planning system 110 identifies 920 one hundred candidate locations for nodes. In another embodiment, the number of nodes to identify is configurable by the user. The user may also be able to manually select or adjust one or more of the candidate locations.

The transport network planning system 110 selects 930 a subset of the candidate locations as the locations for nodes. As described previously, the transport network planning system 110 may select 930 the locations of the nodes to achieve one or more objectives, such as maximizing VTOL coverage, maximizing the reduction in travel time across the network, or minimizing a pre-defined cost function (e.g., to balance VTOL coverage with reductions in travel time). In one embodiment, the selected 930 locations are divided into different phases to be constructed at different times and which may serve different goals. For example, an initial twenty-five nodes might aim to maximize VTOL coverage while the next ten might aim to maximize savings in travel time. The number of nodes and phases may be predetermined or configurable by the user. The nodes may also be of one or more types (e.g., large, medium, and small, each with a different number of landing pads, charging stations, etc.). In some embodiments, the user may also manually set or adjust the location and/or type selected for one or more nodes.

The transport network planning system 110 calculates 940 route optimization statistics based on the selected information. In one embodiment, the user defines additional parameters, such as the number of VTOL aircraft 120 and information about the VTOL aircraft (e.g., number of seats, cruising speed, time required for take-off and landing, battery capacity, etc.). The transport network planning system 110 determines the optimal routing for the VTOL aircraft 120 to meet the hypothetical demand and calculates 940 corresponding routing information. The route optimization statistics may include a percentage of the hypothetical requests served by a VTOL aircraft 120, the total time saved relative to using ground-based transportation alone, a total number of people served, an average number of empty seats on VTOL aircraft when flying, and the like. In other embodiments, different or additional information may be included in the route optimization statistics.

The transport network planning system 110 presents 950 a visualization of the transport network to a user. In one embodiment, the visualization includes a map of the geographic area served by the transport network with the nodes overlaid as geometric shapes (e.g., circles) at the corresponding locations. The visualization may also include the route optimization statistics (e.g., in a table). Additionally or alternatively, the visualization may include a time line indicating how demand varies over time, overlay some or all of the VTOL flight paths on the map, provide access to additional information about nodes and VTOL aircraft 120 (e.g., in response to clicking on the corresponding graphical representation in the visualization), and the like, as described previously.

Figure 10:
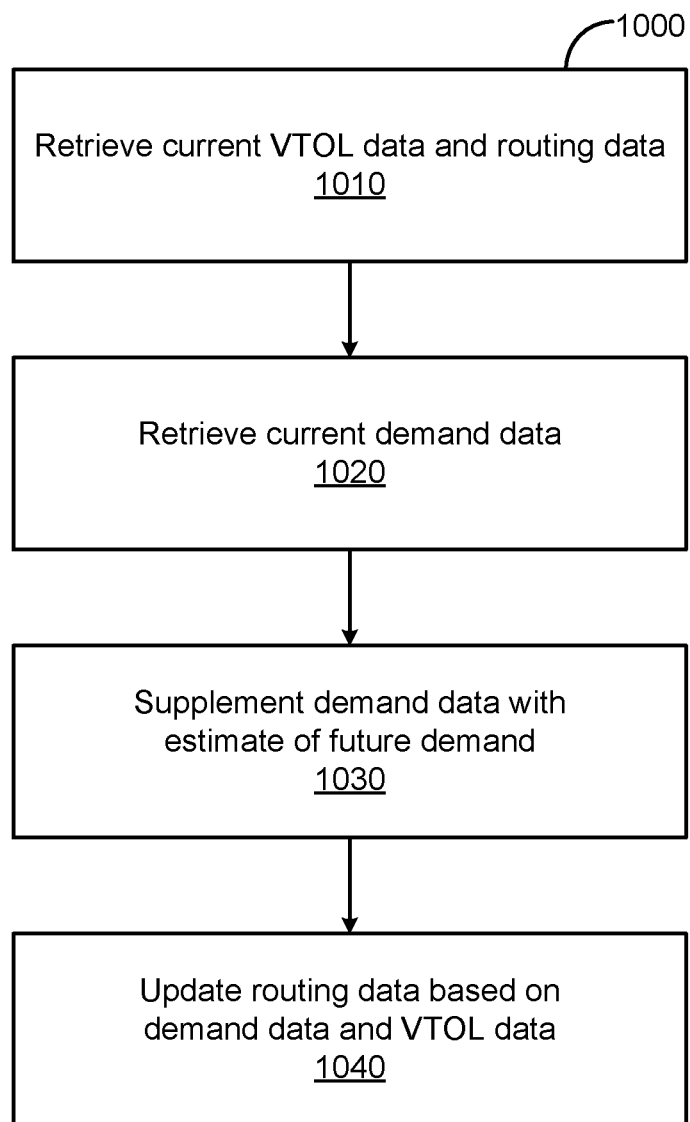
FIG. 10 is a flow-chart illustrating a method for determining routing within a transport network, according to one embodiment.

FIG. 10 illustrates one embodiment of a method 1000 for determining routing for a fleet of VTOLs 120 within a transport network. The steps of FIG. 10 are illustrated from the perspective of the transport services coordination system 115 performing the method 1000. However, some or all of the steps may be performed by other entities or components. In addition, some embodiments may perform the steps in parallel, perform the steps in different orders, or perform different steps.

FIG. 10 illustrates a single iteration of the method 1000. In one embodiment of an active transport network, the method 1000 is repeated periodically (e.g., every minute, every five minutes, etc.) to update the routing data for the fleet of VTOLs 120 based on the current conditions. This may enable efficient use of the fleet, even in scenarios where there is a sudden change in conditions. For example, an unexpected failure in another mode of transport (e.g., a subway system shutting down due to an accident) may result in a sudden surge in requests for transport services that may be serviced by VTOL 120, altering the optimal routing for the fleet. Thus, iterating the method 1000 may provide advantages including increasing the amount of time saved by riders, reduce the total amount of power used, reduce wear and tear on the VTOLs 120, and the like.

In the embodiment shown in FIG. 10, the method 1000 begins with the transport service coordination system 115 retrieving 1010 current VTOL and routing data. The VTOL data is information about each of the VTOLs 120 and may include: a current location, whether the VTOL is on the ground or in the air, a current battery level, a maximum battery level, and the like. The VTOL data may be received from the VTOLs 120 (e.g., via a wireless connection) or estimated based on last know values (e.g., as reported by a node management system 130 when the VTOL 120 was last connected to charge) and the routing data (e.g., a VTOL 120 that is in the air may be assumed to travel along an instructed route at a typical air speed to estimate its current location). The routing data is information about the routes assigned to each VTOL 120. A route may include information such as: a destination, way points to visit en route, a time to depart, a speed to fly at, an amount of time to spend charging before departure or after arrival, a number (and the identity) of riders to carry, and the like. The routing data may be retrieved 1010 from a data store (e.g., the routing data store 640).

The transport service coordination system 115 also retrieves 1020 current demand data. The current demand data includes requests for transport services that have already been sent by users. In one embodiment, the current demand data is set a set of transport requests received from users (e.g., submitted from client devices 140), each including an origin, a destination, and a time of request.

The transport service coordination system 115 supplements 1030 the current demand data with an estimate of future demand. The estimate of future demand may be generated using the techniques described above with reference to the demand estimation subsystem 210. The current demand data may be used as an input to the model used to predict demand. For example, if the current demand is higher than usual for a given day and time, this may indicate that demand may continue to be higher than normal. In one embodiment, the estimate of future demand is a set of hypothetical requests for transport services, each including an origin, a destination, and a time of request within a given time period (e.g., the next fifteen minutes, the next hour, the next four hours etc.). The estimate of future demand may be combined with the current demand data to generate a single set of transport requests (both actual and hypothetical/expected). Thus, the demand data may represent an estimate of demand for the time period that includes both transport requests that have already been received and a prediction of future transport requests.

The transport service coordination system 115 updates 1040 the routing data based on the demand data. In one embodiment, the transport service coordination system 115 determines the optimum routing based on the demand data as well as the VTOL and routing data. This may be done using the optimization approaches described above, with reference to the route optimization subsystem 240. The routing may be optimized based on the retrieved 1010 VTOL data, the demand data, weather data, and the like.

Figure 11:
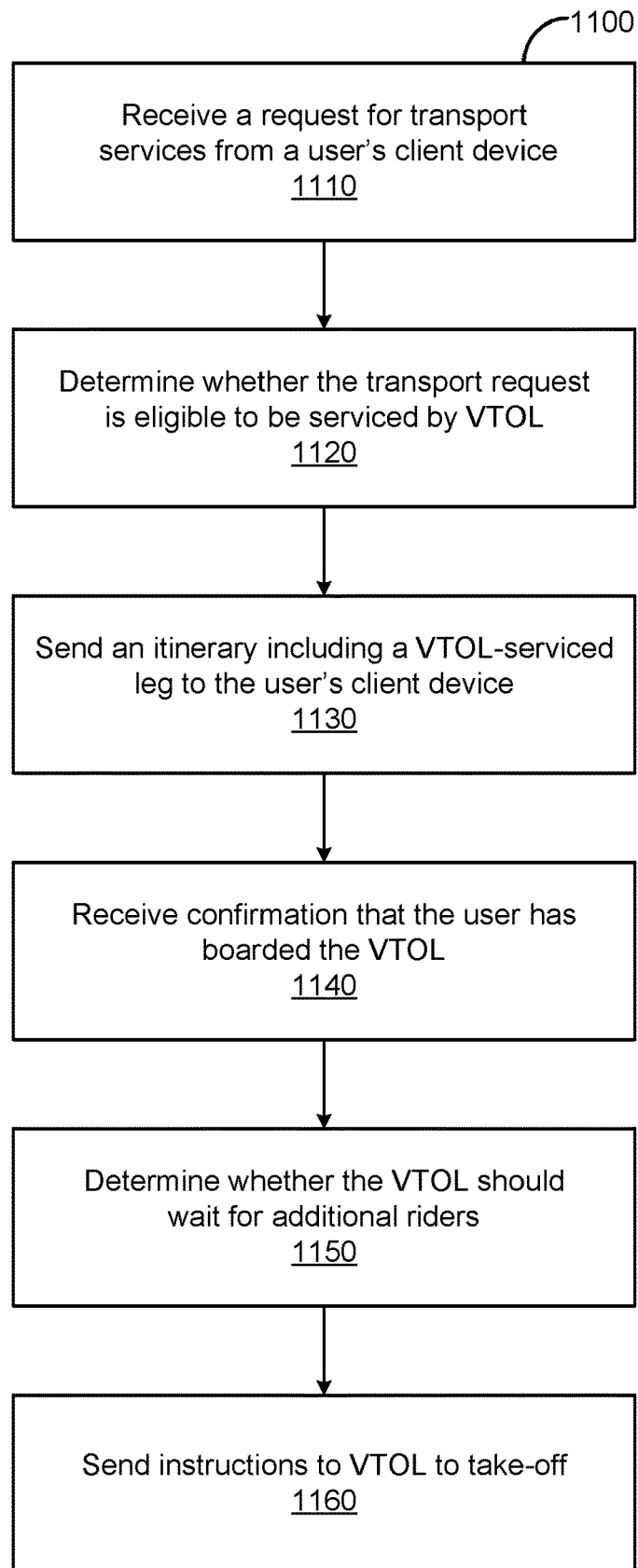
FIG. 11 is a flow-chart illustrating a method for processing a transport services request, according to one embodiment.

FIG. 11 illustrates one embodiment of a method 1100 for processing a transport services request. The steps of FIG. 11 are illustrated from the perspective of the transport services coordination system 115 performing the method 1100. However, some or all of the steps may be performed by other entities or components. In addition, some embodiments may perform the steps in parallel, perform the steps in different orders, or perform different steps.

In the embodiment shown in FIG. 11, the method 1100 begins with transport services coordination system 115 receiving 1110 a request for transport services from a rider's client device 140. In one embodiment, the request includes an origin and a destination. In other embodiments, the request may include additional information, such as a number of riders, an identity of the rider, a time that the transport services are desired, and the like.

The transport services coordination system 115 determines 1120 whether the request is eligible to be serviced by a VTOL aircraft 120. In one embodiment, the transport services coordination system 115 applies a coarse filter to determine 1120 eligibility. If the distance (e.g., the Haversine distance) between the origin and destination is less than a minimum (e.g., 20 miles) or more than a maximum (e.g., 120 miles), the request is not eligible to be serviced by a VTOL aircraft 120. Alternatively or additionally, the transport services coordination system 115 determines the likely time saved if the request is serviced partially by a VTOL aircraft 120 versus using only ground-based transportation. If the time saved exceeds a threshold (e.g., 40%), then the request is eligible. In other embodiments, other thresholds and approaches to determining eligibility may be used. For example, requests may be considered eligible if any time may be saved by servicing them at least in part with a VTOL aircraft and/or based on the probability that the rider will select the VTOL option if it is available, etc. Where multiple VTOL-serviced legs may be included in a single itinerary, the maximum distance may be greater (e.g., 240 miles, 360 miles, or even infinite).

The transport services coordination system 115 sends 1130 an itinerary to the rider's client device 140. Assuming the request was eligible, the itinerary includes at least one leg serviced by a VTOL aircraft 120. In one embodiment, the itinerary includes three legs: (1) from the origin to a take-off node; (2) from the take-off node to a landing node; and (3) from the landing node to the destination. The second leg is serviced with a VTOL 120 while the first and third may either be serviced by ground-based transportation (e.g., a ridesharing service) or require the rider to walk (or otherwise traverse the leg, such as biking, driving a personal car, getting a ride from a friend, etc.).

The rider travels to the take-off node (e.g., by walking or taking ground-based transportation coordinated by the transport services coordination system 115). The rider boards the VTOL aircraft 120 and either a computer system in the VTOL aircraft or a node management system 130 sends a notification to the transport services coordination system 115 that the rider has completed boarding. Alternatively, the rider's client device 140 may confirm boarding based on signals detected by the client device (e.g., Bluetooth, audio, etc.), or the rider may be requested to confirm when boarding is complete via the client device.

In one embodiment, on receiving 1140 confirmation that the rider has boarded, the transport services coordination system 115 determines 1150 whether the VTOL aircraft 120 should take-off immediately or wait for additional riders. In one embodiment, assuming the VTOL aircraft 120 has one or more empty seats, the transport services coordination system 115 calculates a probability that an additional rider will board the VTOL aircraft before a specified time based on demand data. The specified time may be the time at which, if the VTOL aircraft took-off at that moment, the journey time of the rider who has already boarded would be reduced by a threshold amount (e.g., 40%) relative to taking entirely ground-based transportation. If the probability is greater than a threshold (e.g., 90%), the transport services coordination system 115 determines that the VTOL aircraft 120 should wait for additional riders. The probability threshold may be set to balance minimizing empty seats on VTOL aircraft 120 during flight (and thus reducing overall power usage, etc.) with maximizing the time saved for individual riders.

The transport services coordination system 115 sends 1160 instructions to the VTOL aircraft 120 to take-off when one or more conditions are met. In one embodiment, the VTOL aircraft 120 is instructed to take off if: (1) all of its seats are full; (2) the probability of another rider showing up before the specified time is less than the corresponding threshold; (3) another rider shows up and, while there is another empty seat, the probability of yet another rider showing up before the specified time is less than a threshold; or (4) the specified time is reached without another rider showing up. In other embodiments, different or additional conditions may be used to determine when to instruct the VTOL aircraft 120 to take-off. For example, the original rider may be given the option between leaving at the specified time or waiting longer in exchange for a reduction in price.

Additional Considerations

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for planning a transport network and coordinating transport services within that network. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

The invention claimed is:

1. A method comprising:
receiving, from a client device, a request for transport services transmitted over a network, the request including data identifying a rider, an origin, and a destination;
determining, using one or more computer processors and based on the origin and the destination, that the transport request is eligible to be serviced, at least in part, by a vertical take-off and landing (VTOL) aircraft;
sending over the network, to the client device, itinerary data for servicing the transport request, the itinerary data identifying a leg serviced by the VTOL aircraft;
receiving confirmation data indicating that the rider has boarded the VTOL aircraft;
accessing historical demand data indicating a variation in demand over time and that includes an expected number of riders in a given time period;
determining, using the one or more computer processors and based on a comparison between the historical demand data and a current time and day, that the VTOL aircraft should wait for additional riders, wherein determining that the VTOL aircraft should wait for additional riders comprises:
calculating, using a machine-learning model trained with the historical demand data by a minimizing a loss function retrained over time with data corresponding to actual transport requests serviced, a value indicative of a probability that an additional rider will board the VTOL aircraft within a specified time, and
determining that the VTOL aircraft should wait if the probability exceeds a threshold; and
after the VTOL aircraft waits in response to the probability exceeding the threshold, sending an instruction over the network to the VTOL aircraft to take-off responsive to one or more conditions being met.

2. The method of claim 1, wherein determining the request is eligible to be serviced by the VTOL comprises:
determining a distance between the origin and the destination; and
determining the request is eligible if the distance is within a predefined range.

3. The method of claim 1, wherein determining the request is eligible to be serviced by the VTOL comprises:

estimating a first amount of time to travel from the origin to the destination using only ground-based transportation;
estimating a second amount of time to travel from the origin to the destination using the VTOL aircraft; and
determining the request is eligible if the second amount of time is a threshold amount less than the first amount of time.

4. The method of claim 3, wherein estimating the second amount of time comprises:
identifying a plurality of candidate VTOL aircraft;
identifying, for each candidate VTOL aircraft, a take-off location and a landing location;
estimating, for each VTOL aircraft, a total time required for the rider to travel from the origin to the take-off location via ground-based transportation, from the take-off location to the landing location via the candidate VTOL aircraft, and from the landing location to the destination via ground-based transportation;
selecting a candidate VTOL aircraft with a lowest total time; and
using the estimated total time for the selected candidate VTOL aircraft as the estimate of the second amount of time.

5. The method of claim 1, wherein the specified time is determined by:
estimating a take-off time for the VTOL aircraft that results in a threshold percentage reduction in journey time for the rider relative to using only ground-based transportation; and
setting the estimated take-off time as the specified time.

6. The method of claim 1, wherein the historical demand data comprises multiple values for each origin and destination and corresponds to different time periods and different days.

7. The method of claim 1, wherein the confirmation that the rider has boarded the VTOL aircraft is received from the client device.

8. A non-transitory computer-readable storage medium storing executable computer program code that, when executed by one or more processors, causes the one or more processors to perform operations comprising:
receiving, from a client device, a request for transport services transmitted over a network, the request including data identifying a rider, an origin, and a destination;
determining based on the origin and the destination that the transport request is eligible to be serviced, at least in part, by a vertical take-off and landing (VTOL) aircraft;
sending over the network, to the client device, itinerary data for servicing the transport request, the itinerary data identifying a leg serviced by the VTOL aircraft;
receiving confirmation data indicating that the rider has boarded the VTOL aircraft;
accessing historical demand data indicating a variation in demand over time and that includes an expected number of riders in a given time period;
determining, based on a comparison between the historical demand data and a current time and day, that the VTOL aircraft should wait for additional riders, wherein determining that the VTOL aircraft should wait for additional riders comprises:
calculating, using a machine-learning model trained with the historical demand data by a minimizing a loss function retrained over time with data corresponding to actual transport requests serviced, a value indicative of a probability that an additional rider will board the VTOL aircraft within a specified time, and
determining that the VTOL aircraft should wait if the probability exceeds a threshold; and
after the VTOL aircraft waits in response to the probability exceeding the threshold, sending an instruction over the network to the VTOL aircraft to take-off responsive to one or more conditions being met.

9. The non-transitory computer-readable storage medium of claim 8, wherein determining the request is eligible to be serviced by the VTOL comprises:
determining a distance between the origin and the destination; and
determining the request is eligible if the distance is within a predefined range.

10. The non-transitory computer-readable storage medium of claim 8, wherein determining the request is eligible to be serviced by the VTOL comprises:
estimating a first amount of time to travel from the origin to the destination using only ground-based transportation;
estimating a second amount of time to travel from the origin to the destination using the VTOL aircraft; and
determining the request is eligible if the second amount of time is a threshold amount less than the first amount of time.

11. The non-transitory computer-readable storage medium of claim 10, wherein estimating the second amount of time comprises:
identifying a plurality of candidate VTOL aircraft;
identifying, for each candidate VTOL aircraft, a take-off location and a landing location; estimating, for each VTOL aircraft, a total time required for the rider to travel from the origin to the take-off location via ground-based transportation, from the take-off location to the landing location via the candidate VTOL aircraft, and from the landing location to the destination via ground-based transportation;
selecting a candidate VTOL aircraft with a lowest total time; and
using the estimated total time for the selected candidate VTOL aircraft as the estimate of the second amount of time.

12. The non-transitory computer-readable storage medium of claim 8, wherein determining that the VTOL aircraft should wait for additional riders further comprises:
estimating a take-off time for the VTOL aircraft that results in a threshold percentage reduction in journey time for the rider relative to using only ground-based transportation; and
setting the estimated take-off time as the specified time.

13. A computer system comprising:
one or more processors; and
a non-transitory computer-readable storage medium comprising executable computer program code, the computer program code when executed causing the one or more processors to perform operations including:
receiving, from a client device, a request for transport services transmitted over a network, the request including data identifying a rider, an origin, and a destination;
determining based on the origin and the destination that the transport request is eligible to be serviced, at least in part, by a vertical take-off and landing (VTOL) aircraft;
sending, to the client device, itinerary data for servicing the transport request, the itinerary data identifying a leg serviced by the VTOL aircraft;

receiving confirmation data indicating that the rider has boarded the VTOL aircraft;

accessing historical demand data indicating a variation in demand over time and that includes an expected number of riders in a given time period;

determining, based on a comparison between the historical demand data and a current time and day, that the VTOL aircraft should wait for additional riders, wherein determining that the VTOL aircraft should wait for additional riders comprises:

calculating, using a machine-learning model trained with the historical demand data by a minimizing a loss function retrained over time with data corresponding to actual transport requests serviced, a value indicative of a probability that an additional rider will board the VTOL aircraft within a specified time, and determining that the VTOL aircraft should wait if the probability exceeds a threshold; and after the VTOL aircraft waits in response to the probability exceeding the threshold, sending an instruction over the network to the VTOL aircraft to take-off responsive to one or more conditions being met.

14. The computer system of claim 13, wherein determining the request is eligible to be serviced by the VTOL comprises:

determining a distance between the origin and the destination; and determining the request is eligible if the distance is within a predefined range.

15. The computer system of claim 13, wherein determining the request is eligible to be serviced by the VTOL comprises:

estimating a first amount of time to travel from the origin to the destination using only ground-based transportation;

estimating a second amount of time to travel from the origin to the destination using the VTOL aircraft; and determining the request is eligible if the second amount of time is a threshold amount less than the first amount of time.

16. The computer system of claim 15, wherein estimating the second amount of time comprises:

identifying a plurality of candidate VTOL aircraft;

identifying, for each candidate VTOL aircraft, a take-off location and a landing location; estimating, for each VTOL aircraft, a total time required for the rider to travel from the origin to the take-off location via ground-based transportation, from the take-off location to the landing location via the candidate VTOL aircraft, and from the landing location to the destination via ground-based transportation;

selecting a candidate VTOL aircraft with a lowest total time; and using the estimated total time for the selected candidate VTOL aircraft as the estimate of the second amount of time.

17. The computer system of claim 13, wherein determining that the VTOL aircraft should wait for additional riders further comprises:

estimating a take-off time for the VTOL aircraft that results in a threshold percentage reduction in journey time for the rider relative to using only ground-based transportation; and setting the estimated take-off time as the specified time.

* * * * *